United States Patent [19]
Yoshio et al.

[11] Patent Number: 6,034,942
[45] Date of Patent: Mar. 7, 2000

[54] INFORMATION RECORD MEDIUM, APPARATUS FOR RECORDING THE SAME AND APPARATUS FOR REPRODUCING THE SAME

[75] Inventors: Junichi Yoshio; Kyota Funamoto; Takao Sawabe; Ryuichiro Yoshimura; Yoshiaki Moriyama; Kaoru Yamamoto; Akihiro Tozaki, all of Takorozawa, Japan

[73] Assignee: Pioneer Electronics Corporation, Tokyo, Japan

[21] Appl. No.: 09/263,850

[22] Filed: Mar. 8, 1999

Related U.S. Application Data

[63] Continuation of application No. 08/833,476, Apr. 7, 1997, Pat. No. 5,936,925.

[30] Foreign Application Priority Data

Apr. 8, 1996 [JP] Japan .................................. Po8-85608

[51] Int. Cl.[7] ...................................................... G11B 7/24
[52] U.S. Cl. ........................ 369/275.3; 369/32; 386/106; 386/126
[58] Field of Search .............................. 369/275.3, 275.2, 369/58, 54, 47, 48, 32; 386/106, 126, 125

[56] References Cited

U.S. PATENT DOCUMENTS

| | | | |
|---|---|---|---|
| 5,150,262 | 9/1992 | Hosokawa et al. | 360/48 |
| 5,373,497 | 12/1994 | Hanson | 369/275.1 |
| 5,574,704 | 11/1996 | Shimosaka | 369/32 |
| 5,596,457 | 1/1997 | Kanota et al. | 360/48 |
| 5,684,768 | 11/1997 | Terasaki et al. | 369/47 |
| 5,691,972 | 11/1997 | Tsuga et al. | 369/275.3 |
| 5,715,105 | 2/1998 | Katayama et al. | 360/48 |
| 5,742,569 | 4/1998 | Yamamoto et al. | 369/32 |
| 5,793,739 | 8/1998 | Tanaka et al. | 369/60 |
| 5,802,245 | 9/1998 | Kunihiro | 386/98 |
| 5,870,523 | 2/1999 | Kikuchi et al. | 386/95 |
| 5,889,746 | 3/1999 | Moriyama et al. | 369/58 |
| 5,933,569 | 8/1999 | Sawabe et al. | 386/94 |
| 5,949,955 | 9/1999 | Nakai | 386/106 |
| 5,960,152 | 9/1999 | Sawabe et al. | 386/98 |
| 5,966,352 | 10/1999 | Sawabe et al. | 369/32 |

*Primary Examiner*—Tan Dinh
*Attorney, Agent, or Firm*—Morgan, Lewis & Bockius LLP

[57] ABSTRACT

An information recording medium is reproduced by an information reproducing apparatus for controlling a reproduction of record information based on a search control information recorded together with the record information. The medium includes: processed record information including a plurality of information units generated by applying a signal processing onto the record information; a search control information for searching, out of the processed record information, a reproduction record unit which is a record unit including the record information to be reproduced. The search control information is multiplexed with the processed record information. The reproduction record unit includes an initial one of the processed record information constituting the information units included in the reproduction record unit which is recorded at a recording position on a recording medium corresponding to a head portion of an area where the processed record information in the reproduction record unit is recorded.

19 Claims, 13 Drawing Sheets

PHYSICAL STRUCTRE OF RECORD INFORMATION
(PHYSICAL FORMAT)

LOGICAL STRUCTRE OF RECORD INFORMATION
(LOGICAL FORMAT)

| DSI DATA |
|---|
| ○ GENERAL INFORMATION<br>○ SEAMLESS INFORMATION<br>○ ANGLE JUMP<br>　DESTINATION INFORMATION<br>○ VOB UNIT<br>　SEARCH INFORMATION<br>○ SYNCHRONOUS<br>　REPRODUCTION INFORMATION |

# INFORMATION RECORD MEDIUM, APPARATUS FOR RECORDING THE SAME AND APPARATUS FOR REPRODUCING THE SAME

This is a continuation of application Ser. No. 08/833,476 filed on Apr. 7, 1997 and now U.S. Pat. No. 5,976,925.

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded music, a reproduction to listen to the recorded music in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, it is impossible for a user to choose the language used in the subtitle displayed on the screen (e.g. from subtitles of Japanese and the original language) in the case of watching a foreign movie recorded on a LD or to choose the voices of a song (e.g., from English voices or Japanese Voices) in the case of listening to the music recorded on a CD.

Nowadays, apart from the above-mentioned conventional CD, it has been proposed and developed a DVD which is an optical disc which disc size is identical to CD and which recording capacity is enhanced to be approximately ten times larger than that of CD. By recording the subtitles and/or voices of plural languages on the DVD, the user can arbitrarily choose them and enjoy the various and interactive reproduction.

However, in order to record, on the DVD, the voices of plural kinds of languages and/or various kinds of music, the capacity of those information to be recorded necessarily becomes quite large and hence those information should be recorded on DVD in an appropriate efficient recording format, otherwise the processing for retrieving audio information, etc. to be reproduced is complicated and troublesome at the time of reproduction and the reproduced voices or music may be broken or interrupted in its reproduction due to the long retrieving time of the audio information. This results in a serious problem in the reproduction.

SUMMARY OF THE INVENTION

It is therefore an object of the present invention to provide an information record medium, an apparatus for recording the same, and an apparatus for reproducing the same, which can quickly retrieve a target information to be reproduced, such as audio information, in the reproduction process, simplify the reproduction operation and avoid the interruptions or breaks of the reproduced information.

According to one aspect of the present invention, there is provided an information recording apparatus including: a signal processing unit for applying a signal processing onto record information to generate processed record information including a plurality of information units; a search control information generating unit for generating a search control information for searching, out of the processed record information, a reproduction record unit which is a record unit including the record information to be reproduced; a dividing unit for dividing the processed record information into the record units, the dividing unit dividing the processed record information such that, with respect to the reproduction record unit, an initial one of the processed record information constituting the information units included in the reproduction record unit is recorded at a recording position on a recording medium corresponding to a head portion of an area where the processed record information in the reproduction record unit is recorded; a multiplexing unit for multiplexing the divided processed record information with the search control information to output a multiplexed record information; and a recording unit for recording the multiplexed record information on the recording medium.

In accordance with the information recording apparatus thus configured, since the head portion of the area in the reproduction record unit where the processed record information is recorded coincides with the head portion of the processed information included in the information units, the head portion of the information unit may be detected by searching the reproduction record information at the time of reproducing the record information. Therefore, it is unnecessary to search the head portions of the information units, and thus the reproduction operation may be simplified. In addition, it is possible to avoid the interruption of the reproduced information due to the search of the information units.

The dividing unit may include a unit for adding a non-reproduced information in a proximate record unit, which is immediately prior to the reproduction record unit, for a first information amount subsequently to the processed information recorded therein, when an information amount of the processed record information to be recorded in the proximate record unit is less than a capacity of the proximate record information. By this, the remained area within the reproduction record units are filled (recorded) with the non-reproduced information and the total information amount is kept to be constant. Therefore, the head portions of the reproduction record unit may be readily detected, and the head portions of the information units may be securely detected.

Further, the first information amount may be equal to a difference between the capacity of the proximate record unit and the information amount to be recorded in the proximate record unit.

Still further, the record information may be audio information, and the search control information may include an information used for searching a video information, recorded on the recording medium, to be reproduced simultaneously with the processed record information. By this, it is possible to simplify the reproduction operation of the audio information in synchronism with the video information and to avoid the interruptions of the reproduced information.

Alternatively, the record information may include a main record information and a sub record information recorded in accompaniment with the main record information, and the dividing unit may include: a first unit for dividing the processed main record information into first record units and for dividing the processed sub record information by a unit of the first record unit; and a second unit for multiplexing the processed main record information with the processed sub record information so that at least one of the first record units including one of the processed main record information and the processed sub record information constitutes a second record unit, and for outputting a result of the multiplexing as the multiplexed record information.

Accordingly, at the time of reproducing the main and sub record information, the sub record information can be automatically detected by searching the main record information, and it is unnecessary to detect the main and the sub record information separately. Therefore, the reproduction operation may be simplified and the interruption of the reproduced information due to search of the main and the sub record information may be avoided.

According to another aspect of the present invention, there is provided an information recording medium reproduced by an information reproducing apparatus for controlling a reproduction of record information based on a search control information recorded together with the record information, the medium including: processed record information including a plurality of information units generated by applying a signal processing onto the record information; a search control information for searching, out of the processed record information, a reproduction record unit which is a record unit including the record information to be reproduced, the search control information being multiplexed with the processed record information, the reproduction record unit including an initial one of the processed record information, constituting the information units included in the reproduction record unit, which is recorded at a recording position on a recording medium corresponding to a head portion of an area where the processed record information in the reproduction record unit is recorded.

In accordance with the information recording apparatus thus configured, since the head portion of the area in the reproduction record unit where the processed record information is recorded coincides with the head portion of the processed information included in the information units, the head portion of the information unit may be detected by searching the reproduction record information at the time of reproducing the record information. Therefore, it is unnecessary to search the head portions of the information units, and thus the reproduction operation may be simplified. In addition, it is possible to avoid the interruption of the reproduced information due to the search of the information units.

The processed recorded information may include proximate record units, which are immediately prior to the reproduction record units, respectively, and including a non-reproduced information for a first information amount subsequently to the processed information recorded therein, in a case where an information amount of the processed record information to be recorded in the proximate record unit is less than a capacity of the proximate record information. By this, the remained area within the reproduction record units are filled (recorded) with the non-reproduced information and the total information amount is kept to be constant.

Further, the first information amount may be equal to a difference between the capacity of the proximate record unit and the information amount to be recorded in the proximate record unit.

Still further, the record information may be audio information, and the search control information may include an information used for searching a video information, recorded on the recording medium, to be reproduced simultaneously with the processed record information. By this, it is possible to simplify the reproduction operation of the audio information in synchronism with the video information and to avoid the interruptions of the reproduced information.

Alternatively, the record information may include a main record information and a sub record information recorded in accompaniment with the main record information, the processed main record information being divided into first record units and the processed sub record information is divided by a unit of the first record unit, and the processed main record information being multiplexed with the processed sub record information so that at least one of the first record units including one of the processed main record information and the processed sub record information constitutes a second record unit.

Accordingly, at the time of reproducing the main and sub record information, the sub record information can be automatically detected by searching the main record information, and it is unnecessary to detect the main and the sub record information separately. Therefore, the reproduction operation may be simplified and the interruption of the reproduced information due to search of the main and the sub record information may be avoided.

According to still another aspect of the present invention, there is provided an information reproducing apparatus for reproducing the record information from the above described information recording medium including: a demodulating unit for detecting the search control information and the record information of each information unit from the recording medium on the basis of a control signal and for demodulating a detected information to output a demodulated signal; a first extracting unit for extracting the search control information from the demodulated signal; a second extracting unit for extracting the record information from the demodulated signal by the unit of the information units; and a control unit for outputting the control signal on the basis of the search control information extracted.

In accordance with the reproducing apparatus thus configured, the head portions of the information units can be detected by searching the reproduction record units. Therefore, it is unnecessary to search the head portions of the information units, and hence the reproduction operation may be simplified. In addition, it is possible to avoid the interruption of the reproduced information due to the search of the head portions of the information units.

Further, the second extracting unit may disregard the non-reproduced information and extracts only the record information. By this, the remained area within the reproduction record units are filled (recorded) with the non-reproduced information and the total information amount is kept to be constant.

Still another aspect of the present invention, there is provided an information reproducing apparatus for reproducing the record information from the above described information recording medium including: a demodulating unit for detecting the main record information and the sub record information from the recording medium by the unit of the second record unit, and for demodulating a detected information to output a demodulated signal; an extracting unit for extracting the main record information and the sub record information by the unit of the first record unit; and a decoding unit for decoding the main record information and the sub record information together with each other.

Accordingly, at the time of reproducing the main and sub record information, the sub record information can be automatically detected by searching the main record information, and it is unnecessary to detect the main and the sub record information separately. Therefore, the reproduction operation may be simplified and the interruption of the reproduced information due to search of the main and the sub record information may be avoided.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a diagram showing information included in DSI data;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

Information unit: Audio frame
Record unit, second record unit: Audio pack
Reproduction record unit: Reproduction audio pack
Proximate record unit: Proximate audio pack
Main record information: Main frame
Sub record information: Expansion portion frame
First record unit: Audio packet
Retrieve control information: DSI data (I) Embodiment of Information Record Medium First of all, a physical structure and a logical structure as well as an operation of a DVD, as one embodiment of the information record medium to which the present invention is applied, will be explained with reference to FIGS. 1 to 8.

Figure 1:
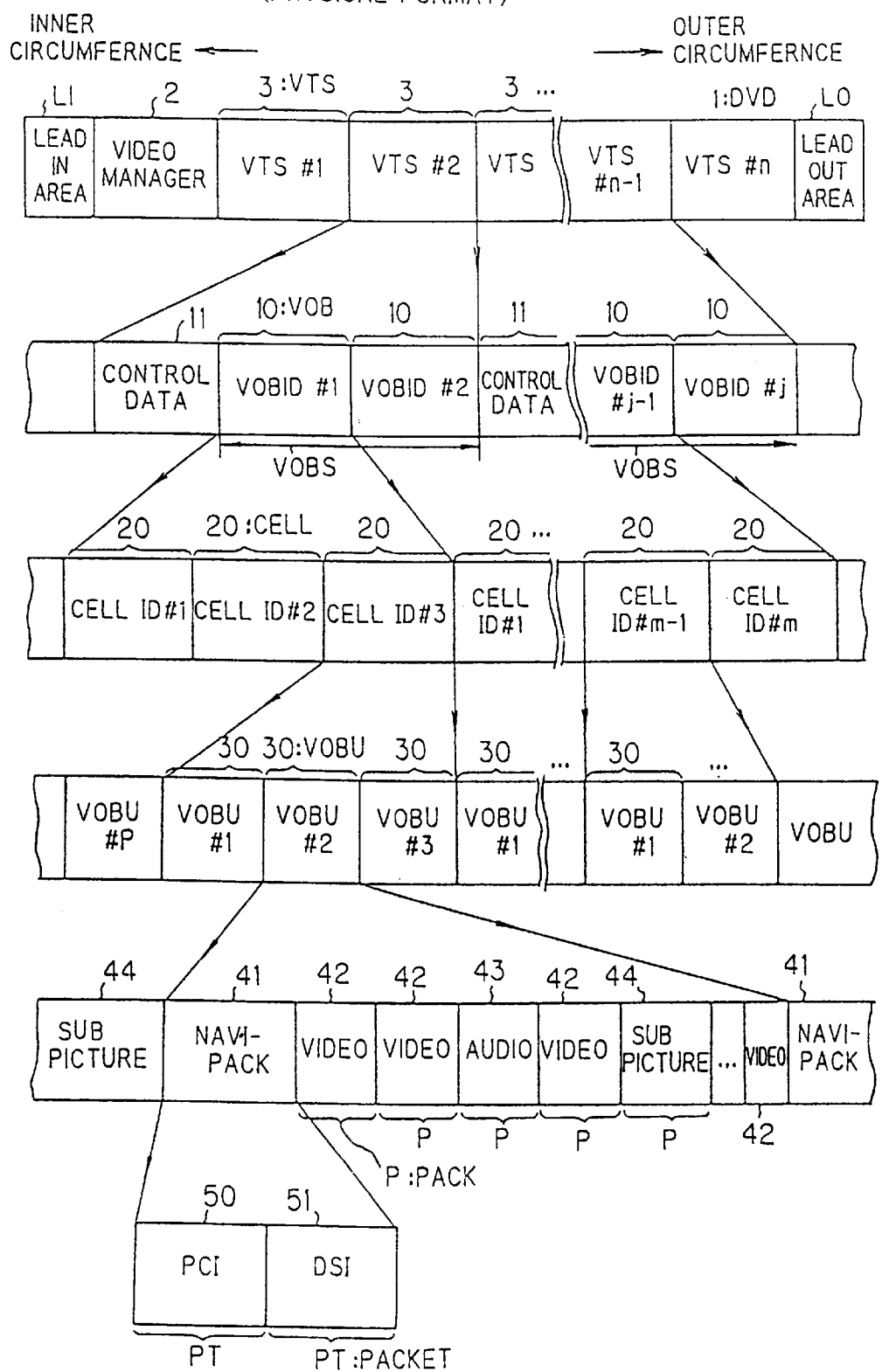
FIG. 1 is a diagram showing a physical structure of record information of a DVD as one embodiment of the present invention.

At first, a record format of video information and audio information (including voices, music and the like) on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or, one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1 cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes one of the video information, the audio information and sub picture information (which is defined as information of a sub picture such as a subtitle of a movie etc.).

One VOB unit 30 is provided with: a navi-pack (a navigation pack) 41 in which control information for controlling the video information, etc., included in the VOBU 30; a video data 42 for the video information serving as video information; an audio data 43 for the audio information serving as audio information; and a sub picture data 44 for the sub picture information serving as sub video information. Here, the video data 42 includes only the video data, and the audio data 43 includes only the audio data. Further, in the sub picture data 44, only graphic data such as a character and a diagram as the sub picture is recorded. It is prescribed by a standard specification of the DVD that there are 8 kinds of audio recordable on the DVD 1 while 32 kinds of sub picture recordable on the DVD 1.

The above data are recorded such that the reproduction time of one VOBU 30 (the reproduction time of data recorded between one navi-pack 41 and next navi-pack 41 adjacent thereto) is equal to or longer than 0.4 seconds.

Further, there always exists the navi-pack 41 at its head portion in one VOBU 30. On the other hand, there may not exist each of the video data 42, the audio data 43 and the sub picture data 44 in one VOBU 30, or, even in case that these packs exist in one VOBU 30, the number of the packs and the order of the packs are freely determined.

Here, each of the video data 42, the audio data 43 and the and the sub picture data 44 shown in FIG. 1 is generally referred to as "pack P". Namely, in a single VOB unit 30, there are recorded the video data 42, the audio data 43 and the sub picture data 44 in a manner divided into the packs P. The pack P in which video data 42 is recorded is referred to as "video pack VP", the pack P in which audio data 43 is recorded is referred to as "audio pack AP", and the pack P in which the sub picture data 44 is recorded is referred to as "sub picture pack SP". These packs are determined and set according to the MPEG2 (Moving Picture Experts Group 2) system, described later, which is used in recording record information on the DVD 1, and one sector normally corresponds to one pack P in the DVD 1 of the present embodiment. Further, read-out start time information called SCR (System Clock Reference) information are recorded in the pack headers, which are recorded at the head portions of the respective packs P. The SCR represents the read-out start time on the reproduction time basis at which data in the respective packs P are read out from a track buffer described later to start data input to respective data buffers which are also described later. In the packs P, normally, the video data 42, the audio data 43 and the sub picture data 44 are recorded as plural packets, which are the record units obtained by departmentalizing (dividing) the pack P.

Finally, the navi-pack 41 is provided with: a DSI (Data Search Information) data 51 including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 including information related to a display control at a time of displaying the video image or outputting the audio sound, which is searched on the basis of the information of the DSI data 51. Here, the DSI data 51 and the PCI data 50 are recorded in the forms of DSI packets and PCI packets, as the packets PT, respectively.

Further, all video data included in one VOBU 30 consist of at least one GOP (Group Of Pictures) In the PCI data 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture data 44 as the sub picture information.

Further, it is possible to include information, in the high light information, used for setting a value of a register in a system controller (described later) in a reproducing apparatus S1. This case is described by taking an example in which an educational software is recorded on the DVD 1 as the record information. In an educational software, test questions are displayed on a monitor, and then plural candidates of the correct answer are displayed as selective items using the sub picture data 44. In this case, the high light information includes command information corresponding to the respective selective items. When a user selects the correct item corresponding to the correct answer to the question, the system controller adds some points corresponding to the correct answer to a predetermined register in it, on the basis of the command information in the high light information corresponding to the selective item. The system controller adds no point to the register when the user selects an incorrect item. Questions and answers are repeated in this way for a given number of questions. When all questions are finished, the system controller refers to the register in which the total points are calculated, on the basis of the other command information (e.g., a command information in the PGCI). If the total point is larger than a given value determined in advance, the system controller allows the pick up to jump to the recording position where the questions of next (higher level) step is recorded. If the total point is smaller than the given value, the system controller allows the pickup to jump to the recording position where the questions for brushup are recorded. As described above, it is possible to set the register in the system controller by the high light information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction By this, the compression recording is enabled with respect to the picture.

Figure 2:
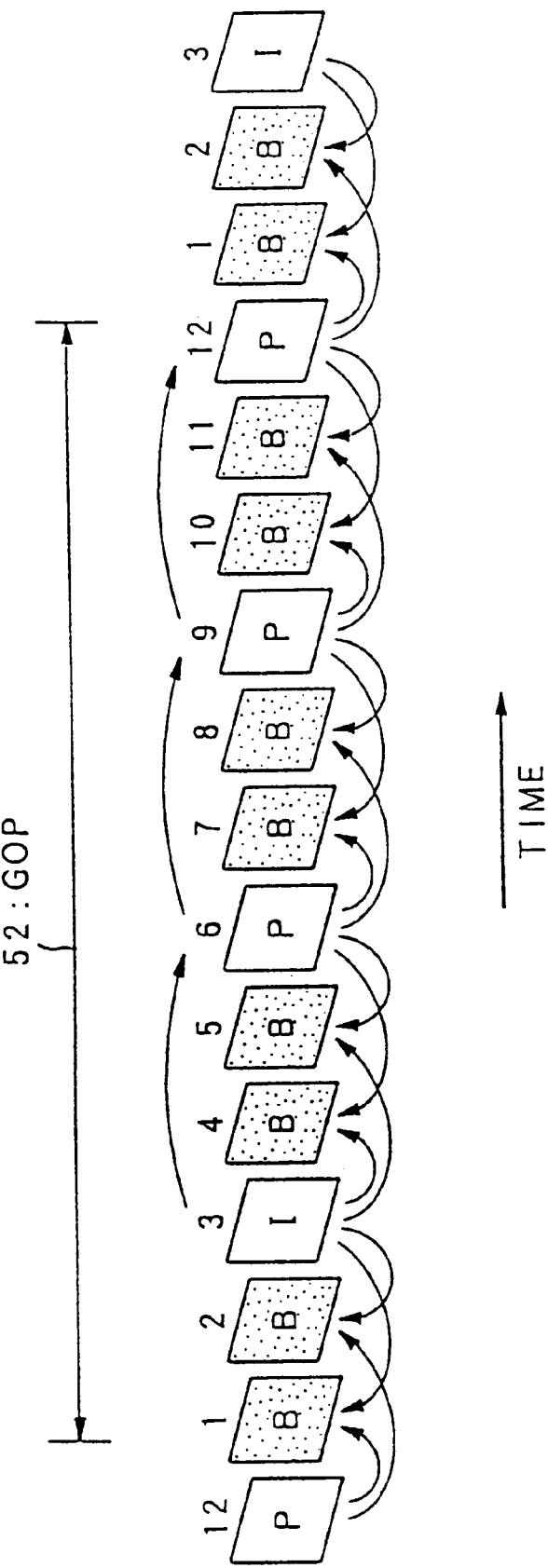
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" in FIG. 2 is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

Next, the description will be given of an audio data 43 recorded on the DVD I according to the present invention. The audio data 43 may include audio data which is compressed and not compressed. As for the compression system for compressing the audio data, there are an MPEG2 system, which is the same compression system as used for the compression of video data 42, and a MPEG1 (Moving Picture Expert Group 1) system which is one generation older than the MPEG2 system.

The audio data 43 compressed by the MPEG2 system includes an MPEG1 compatible portion which can be decoded by an exclusive decoder for the MPEG1 system, and an expansion portion which can not be decoded by the exclusive decoder for the MPEG1 system. The audio data 43 recorded in the expansion portion is appendant to the audio data 43 included in the MPEG1 compatible portion and needs to be reproduced successively to the audio data 43 included in the MPEG1 compatible portion.

In both standards of the MPEG1 system and the MPEG2 system, an audio frame is defined as an information unit which is compressed in such a manner that an original data before the compression is completely restorable and reproducible by itself. Namely, in a structural view, the audio frame in the audio data 43 corresponds to the GOP in the video data 42. Therefore, it is not possible to start reproduction from a middle portion of a single audio frame. In addition, one audio frame must be reproduced from its head portion, and hence the reproducing apparatus needs to search for or retrieve the head portion of the audio frame to reproduce it.

The capacity of audio data 43 recordable in one audio pack described above is not always and necessarily equal to the capacity of information to be stored in one audio frame. Therefore, plural audio frames may constitute one audio pack. Alternatively, one audio frame may be divided into plural audio packs which are recorded on the DVD 1 in a distributed manner by the unit of audio pack. In such a case, there occur no serious problem in reproduction because the audio frames thus divided are collected together and supplied to the audio decoder of the reproducing apparatus as one audio frame, prior to the decoding process thereat.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them (especially combining the cells 20) in the logical structure shown in FIG. 3, is recorded on the DVD 1, especially in the control data 11.

Figure 3:
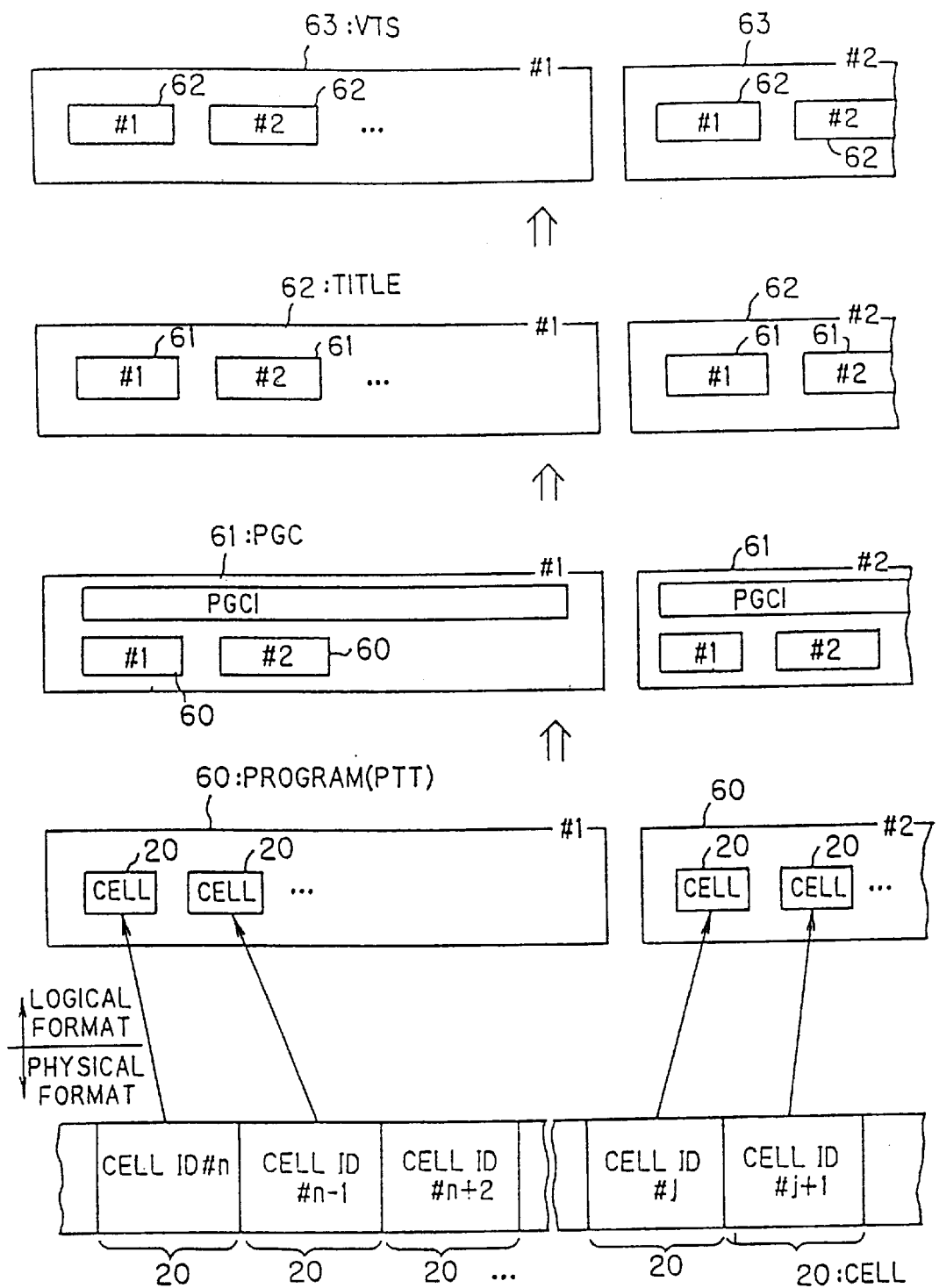
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT Of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG.

3, the number as treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 maybe in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
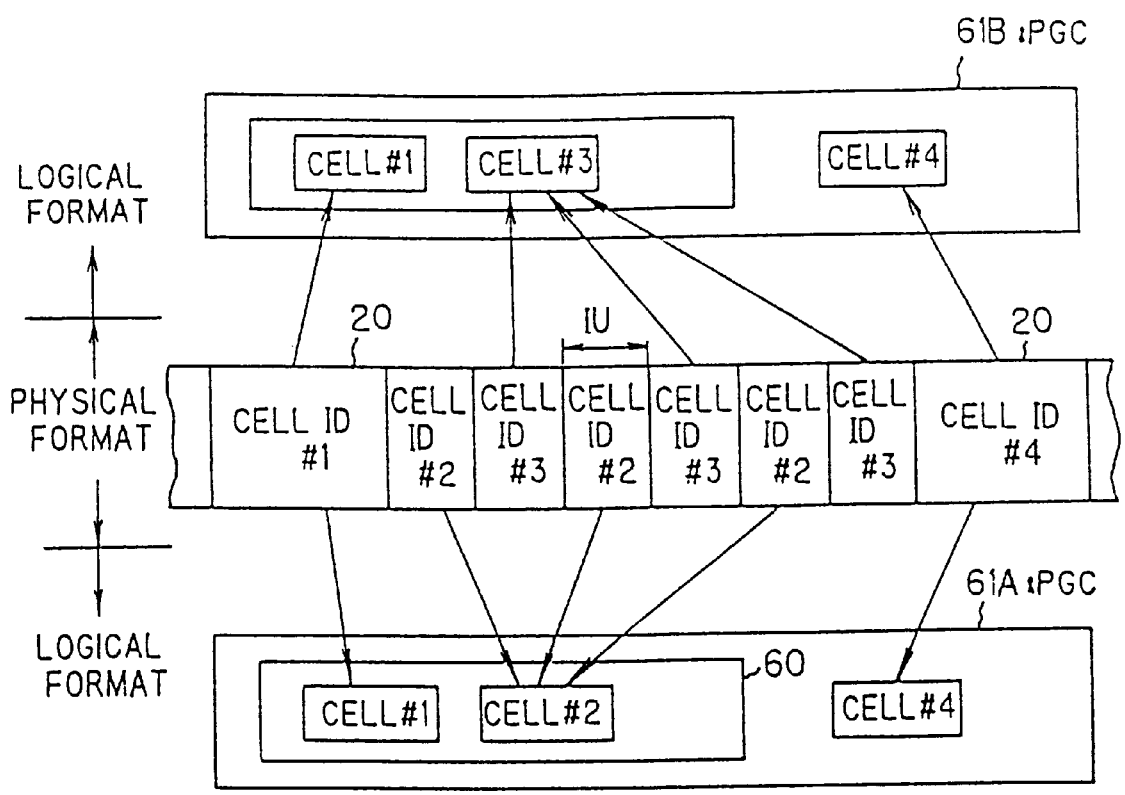
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record the information at various hierarchy classes explained above, the record information having the above explained recording format is suitable for an information record medium having a large memory capacity, such as the aforementioned DVD 1, which memory capacity is so large that audio sounds or subtitles in various kinds of languages in addition to the movie itself can be recorded on a single optical disk as for the audio voice or subtitle of the movie.

Next, among the video information and the audio information having the above mentioned physical structure and logical structure, the DSI data 51 especially related to the present invention is explained with reference to FIG. 5.

In the DSI data 51, the search information to search the information to be reproduced and displayed, more concretely, the information to search the video, audio or sub picture to be reproduced and displayed by the unit of the aforementioned VOB unit 30, the information to perform the aforementioned seamless reproduction, and the information to search the audio or sub picture to be synchronized with the video, are recorded or described as aforementioned.

These information are classified as following.

(1) information to set a timing of each constitutional element in the reproducing apparatus described later, at a time of starting a certain operation specified by the user, (2) information to recognize a position on the DVD 1, which corresponds to the data classification on the logical structure shown in FIG. 3, of the optical pickup of the reproducing apparatus described later, (3) information to write only the data to be reproduced and displayed into a track buffer of the reproducing apparatus described later, (4) information to indicate a record position (i.e. a target or destination position) on the DVD 1 of the data to be accessed (detected)

(5) protection information to protect the other data etc., if a desired data address cannot be searched at a time of searching the data for accessing.

Next, it is explained with reference to FIG. 5, how to concretely record each of the above mentioned information in the DSI data 51, to which the information classified in the above mentioned manner are to be recorded.

As shown in FIG. 5, more concretely, the DSI data 51 is provided with: general information which is commonly used within one DSI data 51; seamless information to perform the seamless reproduction; angle jump destination information to perform an angle reproduction; VOB unit search information to search a desirable VOB unit 30; and synchronous reproduction information which is the information related to the sub picture data 44 or audio data 43 to be reproduced and displayed in synchronization with the VOB unit 30 including the pertinent DSI data 51.

Here, the angle reproduction is explained in which the above mentioned angle jump destination information is applied. In the DVD 1 of the present embodiment, it is possible to record the video information of one scenery from a plurality of view points on a same time axis as for one movie (title 62), for example. Namely, more concretely, it is possible to record the video image of a scenery from a view point of an actor acting in the movie, and also record a video image of the same scenery from a view point of an actress acting in the movie. Then, these video images may be reproduced while exchanging these video images according to a selection by the user, by an input operation during watching and listening to it, for example, which is called as an "angle change (or switch) reproduction".

Each information shown in FIG. 5 is explained in more detail. The general information includes: time information to set a reproduction start timing of each constitutional element of the reproducing apparatus described later, as for a certain operation specified by the user; a record position (e.g. a logical address) on the DVD 1 of each data to construct the logical structure shown in FIG. 3; protection information to protect, if the address of the desired data cannot be detected at the time of data search, other data etc.; and time information to perform a time search operation of the reproducing apparatus described later (e.g. elapse time information indicating an elapse time in the cell 20).

The seamless information includes: information indicating a record position (e.g. a logical address) on the DVD 1 of each data required for the seamless reproduction; and time information to set in advance the timing of connecting reproduced picture planes respectively in the seamless reproduction.

Further, the angle jump destination information includes address information indicating a record position on the DVD 1 of data to be reproduced so as to perform the angle change reproduction in the seamless manner (i.e. in the continuous manner) when changing the angle.

The VOB unit search information includes address information indicating a record position on the DVD 1 of the other VOB unit 30 (i.e., other DSI data 51) to be reproduced, which is positioned in a predetermined area at the vicinity of the pertinent DSI data 51.

Finally, the synchronous reproduction information related to the present invention includes address information indicating a record position on the DVD 1 of the sub picture data 44 or the audio data 43 to be reproduced in synchronization with the VOB unit 30 including the pertinent DSI data 51. Out of the address information, an address information indicative of the record position on the DVD 1 of the audio data 43 to be firstly reproduced in synchronism with the video data 42 at the head portion of the VOBU 30 is especially called as "audio pack address".

By use of the DSI data 51 including each of the above described information, the processes such as the time search operation etc., can be performed by the reproducing apparatus described later.

Next, the description will be given of the physical structure (physical format) of the audio data 43 on the DVD 1 according to the present invention, with reference to FIGS. 6 to 8, in both cases, i.e., the case in which audio data 43 is compressed by the MPEG1 system and the case in which the audio data 43 is compressed by the MPEG2 system, respectively.

First, with referring to FIGS. 6 and 7, the physical format of the audio data 43 compressed by the MPEG2 system will be described. In FIG. 6, the upper part represents the condition of data recorded on the DVD 1. The middle part represents the condition of the data in which only the audio packs AP constituting the stream of the same kind is separated by a demultiplexer of a reproducing apparatus described later (i.e., the condition of an elementary stream which is made in the form of packs). Further, the lower part represents the condition of the data in which the pack headers 64 and the packet headers 65 are eliminated by the demultiplexer to extract only the audio data 43, and the audio frames AF are in condition to be successively decoded, i.e., in the form of so-called an audio elementary streams. The demultiplexer outputs a signal in the condition shown in the lower part of FIG. 6, which is supplied to an audio decoder via an audio buffer.

In the DVD 1 according to the present embodiment, the audio elementary stream after the compression is recorded in such a manner as to constitute audio packets APT, which are recording units obtained by further departmentalizing the audio pack AP.

Figure 6:
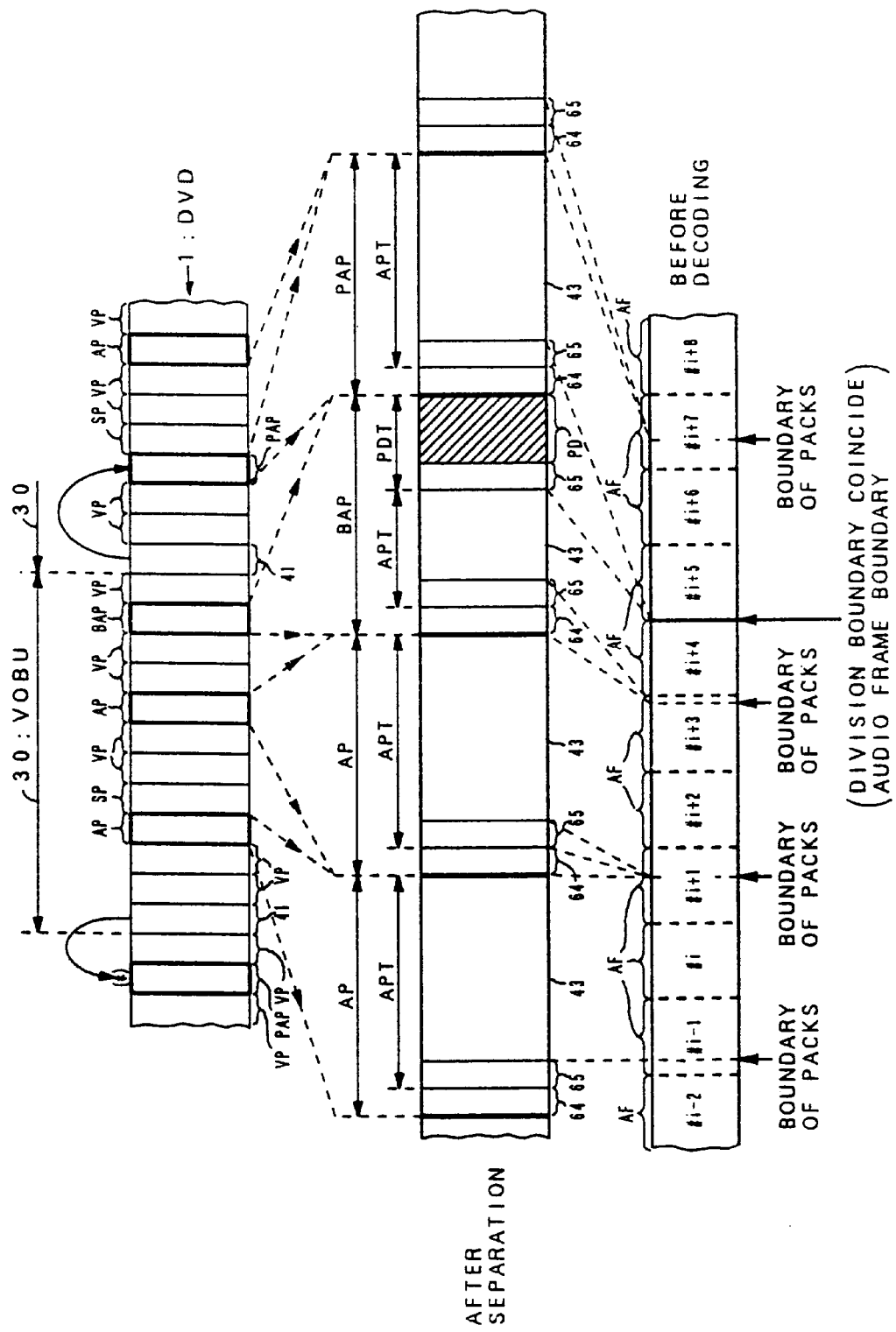
FIG. 6 is a diagram showing a recording manner of audio data according to the MPEG1 system.

As shown in the middle part of FIG. 6, as for the audio data 43 according to the MPEG1 system, in the audio pack AP which is specified by the audio pack address in the DSI data 51 within the aforementioned navi-pack 41 (i.e., the audio pack AP which includes audio data 43 to be reproduced synchronously with the video data 42 and the sub picture data 44 controlled based on the navi-pack 41 which includes the pertinent audio pack address. This audio pack AP is hereinafter referred to as "reproduction audio pack PAP".), an initial data in the audio frame AF constituting the compressed audio data 43 included in the reproduction audio pack PAP is recorded at the record position on the DVD 1 corresponding to the head portion of the area in the reproduction audio pack PAP where the audio data 43 is to be recorded. In other words, in the reproduction audio pack PAP, the head portion of the area in the reproduction audio pack PAP where the audio data 43 is recorded normally to coincide with the head portion of the area of the audio frame AF included in the reproduction audio pack PAP. Since the production audio pack PAP has such an relationship with the audio frame AF, it is possible to constantly start reproduction from the head portion of the audio frame AF by reproducing the reproduction audio pack PAP from its head portion, thereby reducing the searching time required to search the head portion of the audio frame AF.

The reproduction audio pack PAP and the navi-pack 41 specifying the pertinent reproduction audio pack PAP are not necessarily included in the same VOB unit 30. Namely, they may be included in different VOB units 30 like the reproduction audio pack PAP attached with the mark * in the upper part of FIG. 6.

In addition, as described above, in the reproduction audio pack PAP, in order to make the head portion of the area in the pertinent reproduction audio pack PAP where the audio data 43 coincide with the head portion of the audio frame AF included in the pertinent reproduction audio pack PAP, there is recorded padding data PD (indicated by the hatched portion in the middle part of FIG. 6) in the audio pack AP immediately prior to the reproduction audio pack PAP (hereinafter referred to as "proximate audio pack BAP") within the audio stream of the same kind as the reproduction audio pack PAP. The padding data PD is a non-reproduced information which is not reproduced (i.e., neglected in the reproduction operation). If the recording capacity of the proximate audio pack BAP is larger than the information capacity of the audio data 43 to be actually recorded therein, the padding data PD is recorded in the remaining area in the proximate audio pack BAP subsequent to the audio data 43 recorded therein. More concretely, data "0000 . . . " is recorded as the padding data PD, for example. By including the padding data PD in the proximate audio pack BAP to be recorded on the DVD 1 according to need, the head portion of the audio frame AF may be securely detected by starting the reproduction from the head portion of the reproduction audio pack PAP.

Next, the description will be given of the detailed structure of the audio pack AP of the audio data 43, which is compressed according to the MPEG1 system, by referring to FIGS. 6 and 7. In FIG. 7, the upper part shows the data in the condition recorded on the DVD 1, and the lower part shows the condition in the elementary stream which is made in the form of packs.

As described above, the audio pack AP in the audio data 43 compressed according to the MPEG1 system includes the reproduction audio pack PAP, the proximate audio pack BAP and the normal audio pack AP other than the reproduction audio pack PAP and the proximate audio pack BAP.

These audio packs AP are generated by compressing the original data according to the MPEG1 system and making the compressed data into the form of packets and packs. In this case, in the audio packs AP other than the proximate audio pack BAP, one audio pack AP is basically comprised of only one audio packet APT (see. the middle part of FIG. 6). On the other hand, as an exception, one proximate audio pack BAP includes an audio packet APT,and a padding packet PDT.

In the normal audio packs AP, the compressed audio data 43 included therein is recorded in a manner divided and distributed into plural audio packets APT dependently upon the capacities of the respective audio packets APT. Here, it is unnecessary that the boundaries of the audio data 43 divided into the plural audio packets ADT coincide with the boundaries of the audio frames AF (see. the lower part of FIG. 7). Actually, each audio pack AP includes the pack header 64 at its head position, the packet header 65 subsequent to the pack header 64, and the compressed audio data 43 to be included in that audio pack AP. Here, the pack header 64 includes a start code indicating the head of the audio pack AP and the aforementioned SCR, and the packet header 65 includes an identification information indicating that the audio data 43 included in the audio packet APT is compressed according to the MPEG1 system.

Figure 7:
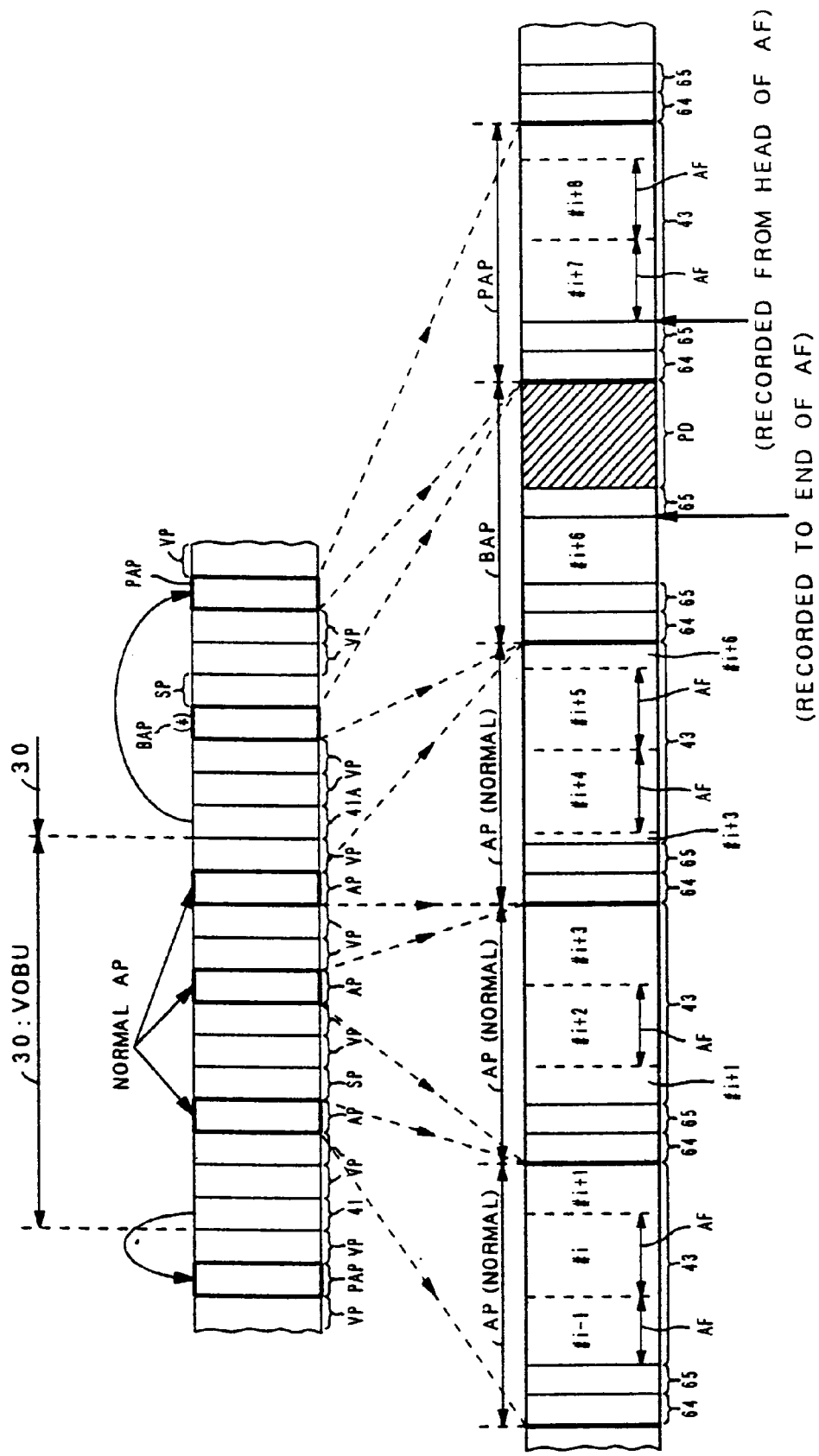
FIG. 7 is a diagram showing a detailed structure of audio packs according to the MPEG1 system.

Also, the upper part of FIG. 7 shows an audio pack AP attached with the mark "*", which is positioned between the recording positions of the navi-pack 41 and the reproduction audio pack PAP specified by the audio pack address in the DSI data 51 within the above navi-pack 41. This audio pack AP with the mark "*" is controlled its reproduction as the contents of the VOB unit 30 which is controlled by the navi-pack 41 positioned, prior to the navi-pack 41A.

Further, the proximate audio pack BAP includes, as shown in the lower part of FIG. 7, the pack header 64 at its head position, the packet header 65 subsequent thereto, and the audio data 43 to be included in the proximate audio pack BAP. If the recording area remained after recording the audio data 43 in the proximate audio pack BAP, there is recorded, at the remained area, the padding packet PDT, which includes the packet header 65, at its head position, indicating that the packet is the padding packet PDT and that the data recorded for the capacity of the remained recording area in the proximate audio pack BAP after the recording of the audio data 43 is the padding data PD.

Next, by referring to FIG. 8, the physical structure of the audio data 43 compressed according to the MPEG2 system will be described. In FIG. 8, the upper part shows the respective data in the condition being recorded on the DVD 1, and the middle part shows the condition in which only the audio packs AP, constituting the stream of the same kind, are separated by the demultiplexer. The lower part shows the condition in which the pack headers 64, the packet headers 65 and the padding packet PDT are further eliminated to extract only the audio data 43, thereby constituting the audio elementary stream in which the audio frames AF (main frames and expansion portion frames described later) are successively provided to enable their decoding. Also in the case of the MPEG2 system, like the case of MPEG1 system, the audio pack AP includes the reproduction audio pack PAP, the proximate audio pack BAP, and the normal audio packs AP other than the reproduction audio packs PAP and the proximate audio packs BAP.

Further, the audio data 43 compressed by the MPEG2 system includes, as mentioned above, the MPEG1 compatible portions and the expansion portions which are appendant to the MPEG1 compatible portions. Further, as for the audio frame AF, one MPEG compatible portion constitutes one audio frame AF, and one expansion portion constitutes other one audio frame AF. Hereinafter, the audio frame AF corresponding to the MPEG1 compatible portion is referred to as "main frame 66", and the audio frame AF corresponding to the expansion portion is referred to as "expansion portion frame 67".

Figure 8:
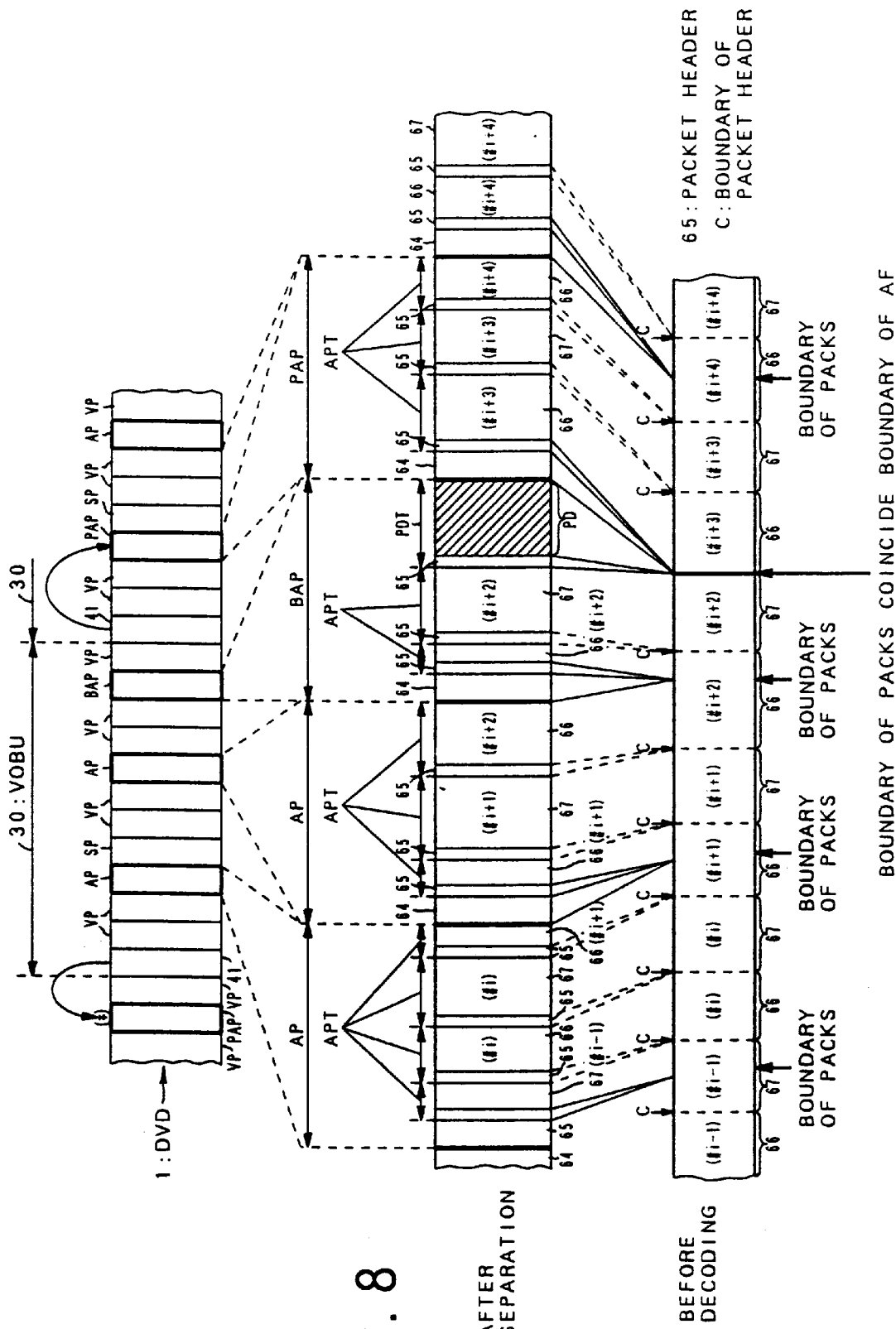
FIG. 8 is a diagram showing a recording manner of audio data according to the MPEG2 system.

As shown in the upper and the middle parts of FIG. 8, as for the audio data 43 according to the MPEG2 system, in the audio pack AP which is specified by the audio pack address in the DSI data 51 within the aforementioned navi-pack 41, an initial data in the audio frame AF constituting the compressed audio data 43 to be included in the reproduction audio pack PAP is recorded at the record position on the DVD 1 corresponding to the head portion of the area in the reproduction audio pack PAP where the audio data 43 is to be recorded. In other,words, in the reproduction audio pack PAP, the head portion of the area in the reproduction audio pack PAP where the audio data 43 is recorded normally coincides with the head portion of the area of the audio frame AF to be included in the reproduction audio pack PAP. Since the reproduction audio pack PAP has such an relationship with the audio frame AF, it is possible to constantly perform reproduction from the head portion of the audio frame AF by reproducing the reproduction audio pack PAP from its head portion, thereby reducing the searching time required to search the head portion of the audio frame AF.

It is a common rule applied to all of the reproduction audio pack PAP, the proximate audio pack BAP and the normal audio pack AP that, as for each main frame 66 and the expansion portion frame 67, only one main frame 66 constitutes one audio packet APT and similarly only one expansion portion frame 67 constitutes one audio packet APT. Namely, different from the case of MPEG1 system, one audio packet APT never includes information capacity more than one main frame 66 or one expansion portion frame 67. In other words, the boundaries of the main frames 66 and the expansion portion frames 67 necessarily and always coincide with the boundaries of the audio packets APT (see. the lower part of FIG, 8).

Further, the audio packets APT including the expansion portion frames 67 appendant to the main frames 66 in the audio packs AP are recorded in succession to the audio packet APT including the main frame 66. In addition, the audio packets APT including the expansion portion frames 67 are recorded in succession to the next audio pack AP in the audio stream of the same kind, if the data amount of the main frame 66 is larger than the recording capacity of the audio pack AP.

The reproduction audio pack PAP and the navi-pack 41 specifying the pertinent reproduction audio pack PAP are not necessarily included in the same VOB unit 30, and they may be included in different VOB units 30 like the reproduction audio pack PAP attached with the mark "*" in the upper part of FIG. 8.

In addition, as described above, in the reproduction audio pack PAP, in order to make the head portion of the area in the pertinent reproduction audio pack PAP where the audio data 43 coincide with the head portion of the audio frame AF included in the pertinent reproduction audio pack PAP, there is recorded a padding packet PDT including the padding data PD (hatched portion in the middle part of FIG. 8) in the reproduction audio pack BAP within the audio stream of the same kind as the reproduction audio pack PAP, similarly to the case of the MPEG1 system, in succession to the expansion portion frame 67 to be recorded (this expansion portion frame 67 constitutes the final audio frame AF included in the proximate audio pack BAP). By including the padding data PD in the proximate audio pack BAP to be recorded on the DVD 1 according to need, the head of the audio frame AF may be securely detected by starting the reproduction from the head portion of the main frame 66 at the time of reproduction.

In the normal audio pack AP according to the MPEG2 system, actually, each audio header 64includes the pack header 64 at its head position, the packet header 65 subsequent to the pack header 64, and the main frames 66 and the expansion portion frames 67 to be included in that audio pack AP. Here, the pack header 64 includes a start code indicating the head portion of the audio pack AP and the aforementioned SCR, and the packet header 65 includes an identification information indicating whether the audio frames AF included in the audio packet APT is the main frame 66 serving as the MPEG1 compatible portion or the expansion portion frame 67 serving as the expansion portion.

As shown in the middle and the lower parts of FIG. 8, respectively, the main frames 66 and the expansion portion frames 67 may be recorded in such a manner that one main frame 66 or one expansion portion frame 67 is divided and recorded over plural audio packs AP. However, at least in the reproduction audio pack PAP, the head portion of the area where the audio data 43 is recorded coincides with the head portion of the main frame 66 included in the reproduction audio pack PAP. In order to record main frames 66 in this manner, the padding data PD is recorded in a form of the padding packet PDT, which includes the packet header 65 recorded at its head position and indicating that the recording area remained within the proximate audio pack BAP is recorded with the padding data PD. The packet header 65 includes an identification information indicating that the packet is the padding packet PDT.

In the MPEG2 system, as described above, the main frame 66 and the expansion portion frame 67, appendant to the main frame 66, are successively recorded in a single audio pack AP or successive plural audio packs in the audio stream of the same kind, and each of the main frame 66 or the expansion portion frame 67 constitutes an audio packet APT. By this, at the time of decoding by a decoder for the MPEG2 system, the main frame 66 and the expansion portion frame 67 appendant thereto can be successively decoded. Therefore, it is unnecessary to search the expansion portion frame 67 individually.

Further, at the time of reproduction using an audio decoder for MPEG1 system, a demultiplexer can readily detect the expansion portion frame 67 which cannot be decoded by referring to the packet header 65, and disregard the expansion portion frames 67 to output only the main frames 66 to the audio decoder (see. the lower part of FIG. 8), because the main frame 66, which can be decoded by the audio decoder, and the expansion portion frames 67, which cannot be decoded by the audio decoder, independently constitute different packets.

(II) Embodiment of Recording Apparatus

Next, an embodiment of recording apparatus for recording the above mentioned control information, video information and audio information onto the DVD 1 will be explained with reference to FIGS. 9 and 10.

Figure 9:
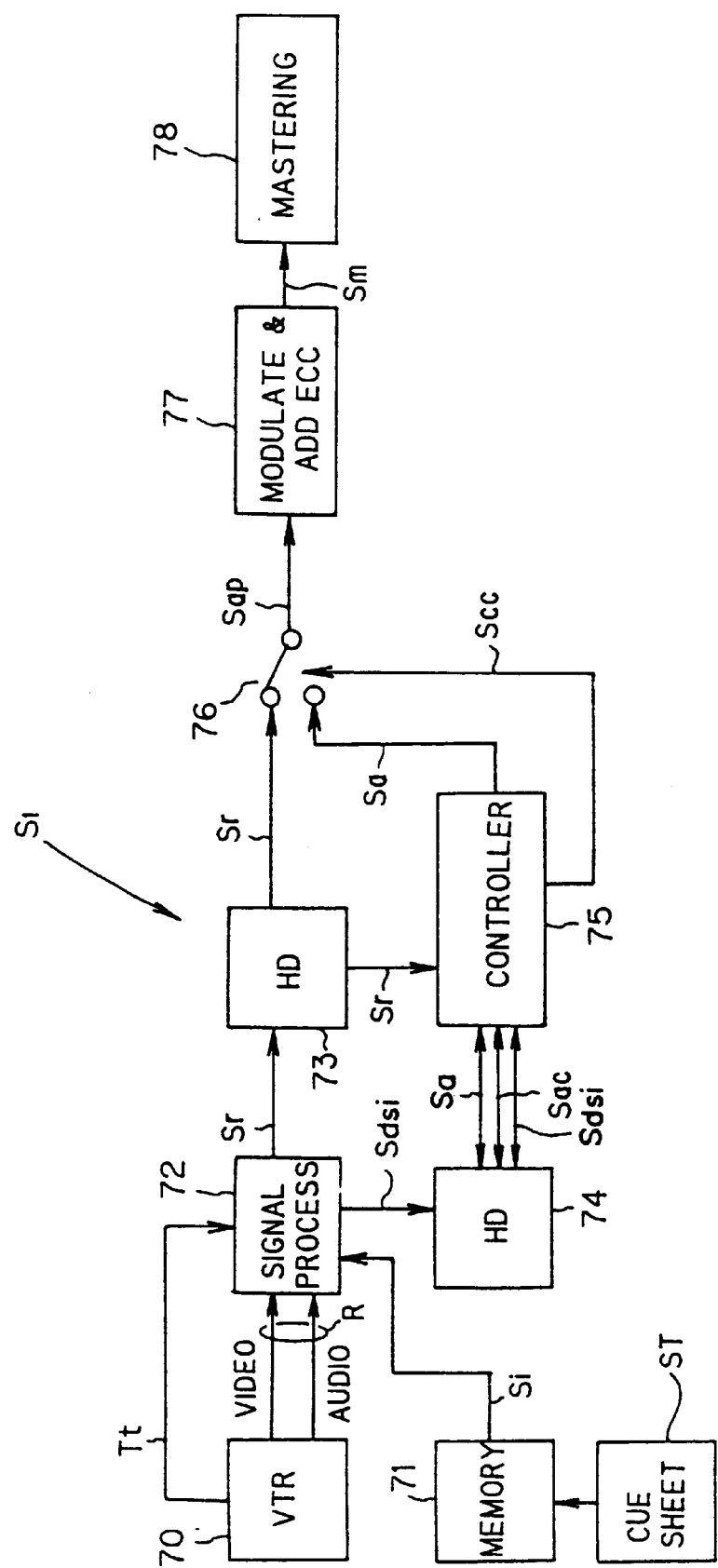
FIG. 9 is a block diagram of an information recording apparatus for recording the DVD in FIG. 1, as another embodiment of the present invention.
Figure 10:
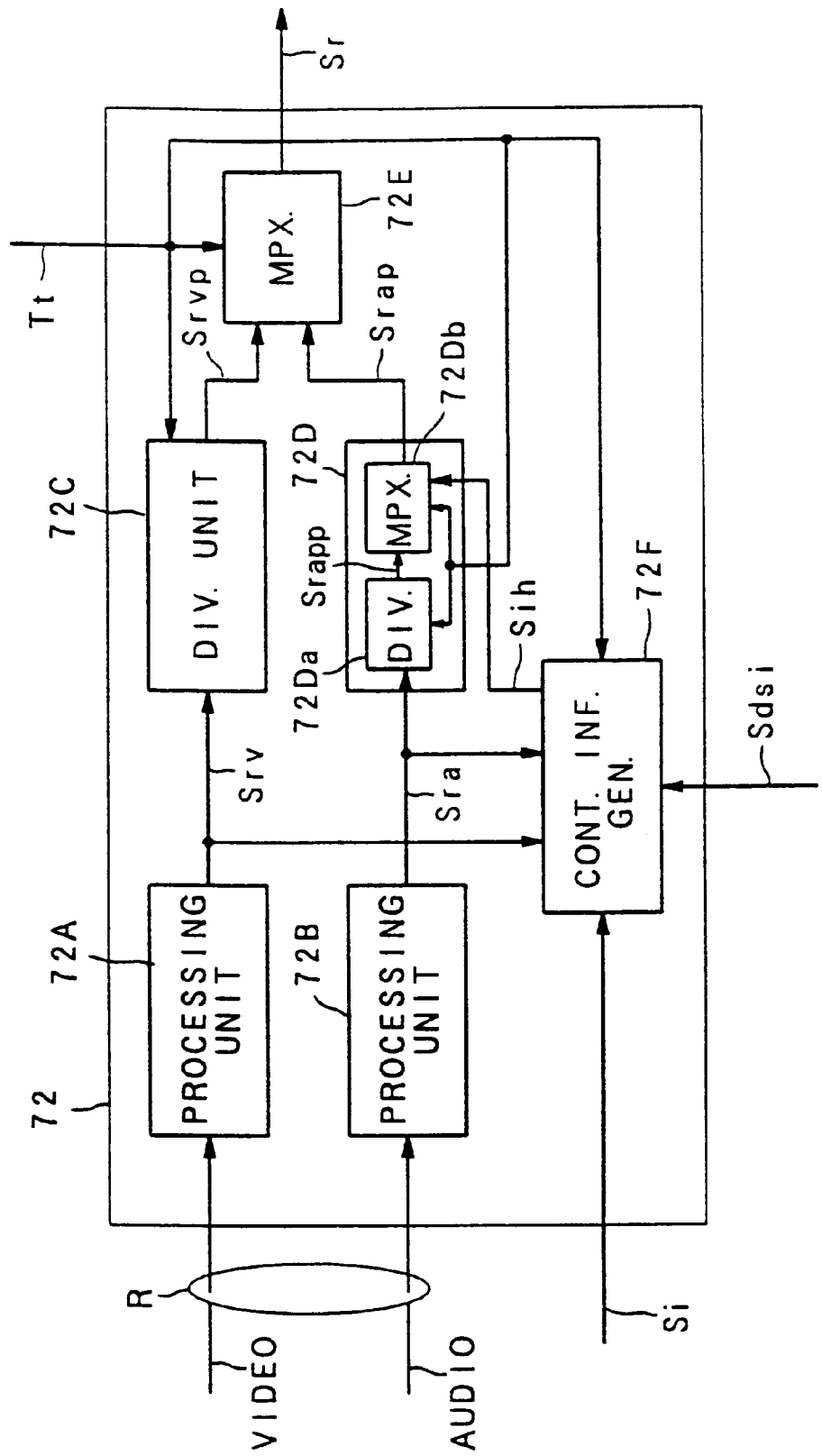
FIG. 10 is a block diagram showing a configuration of the signal processing unit shown in FIG. 9.

As shown in FIG. 9, a recording apparatus S1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

The signal processing unit 72 is provided with processing units 72A and 72B, dividing units 72C and 72D, a multiplexing unit 72E and a control information generating unit 72F. The dividing unit 72D includes a dividing circuit 72Da and a multiplexing circuit 72Db.

Nextly, an operation of the present embodiment is explained.

Record information R, which are a raw material such as audio information, video information etc. to be recorded on the DVD 1, are temporarily recorded in, the VTR 70 by respective units. Then, the record information R temporarily record in the VTR 70 is outputted to the signal process unit 72 by a request from the signal process unit 72 by the unit of the video and the audio information.

The processing unit 72A in the signal process unit 72 A/D (Analog to Digital)-converts the inputted video information and then compresses it by the MPEG1 system or the MPEG2 system to output a processed video signal Srv constituted by the GOPs 52. The dividing unit 72C divides the processed video signal Srv into the video packs VP to output a divided processed video signal Srvp, on the basis of the time code Tt corresponding to the record information R outputted by the VTR 70.

On the other hand, the processing unit 72B in the signal processing unit 72 A/D-converts the inputted audio information, and then compresses it by the MPEG1 system or the MPEG2 system to output a processed audio signal Sra constituted by the audio frames AF.

Subsequently, the dividing circuit 72Da in the dividing unit 72D divides, based on the time code Tt, the processed audio signal Sra into the audio data 43 which constitute the respective audio packets APT according to the MPEG1 system or the MPEG2 system, and outputs a packet divided signal Srapp. Then, the multiplexing circuit 72Db in the dividing unit 72D generates, on the basis of the time code Tt and a header information signal Sih outputted by the control information generating unit 72F, the packet headers 65 and the pack headers 64, and adds them to the respective audio data 43 included in the packet divided signal Srapp.

At this time, if the processed audio signal Sra is compressed according to the MPEG1 system, the dividing circuit 72Da divides the processed audio signal Sra, as for the reproduction audio pack PAP to be reproduced first in synchronous with the video data 42 in the VOBU 30, such that the head portion of the area where the compressed audio data 43 of the audio packet APT in the reproduction audio pack PAP is recorded coincides with the head of the audio frame AF included in the reproduction audio pack PAP, and then outputs the packet divided signal Srapp.

Subsequently, the multiplexing circuit 72Db multiplexes the packet divided signal Srapp with the packet headers 65 and the pack headers 64 to generate the audio elementary stream in the form of packs, and outputs it as the divided processed audio signal Srap. For this purpose, the multiplexing circuit 72Db generates the padding data PD to be recorded within the remained recording area of the proximate audio pack BAP, if the recording capacity of the proximate audio pack BAP is larger than the data amount of the audio data 43 to be recorded therein. Then, the multiplexing circuit 72Db multiplexes the padding data PD with the audio data 43 in the proximate audio pack BAP with the packet header 65 indicating that the packet is the padding packet at its head position. By the operation of the multiplexing circuit 72Db for the proximate audio pack BAP, the head portion of the area where the audio data 43 is to be recorded coincides with the head of the audio frame AF included in the reproduction audio pack PAP, which is subsequent to the proximate audio pack BAP.

On the other hand, if the audio data 43 is compressed according to the MPEG2 system, the dividing circuit 72Da first divides the processed audio signal Sra into the main frames 66 and the expansion portion frames 67. Then, the dividing circuit 72Da further performs a processing to combine the respective main frames 66 and the expansion portion frames 67 to each other to constitute the audio packs AP. At this time, as for the reproduction audio pack PAP, the processed audio signal Sra is divided such that the head of the area where the compressed audio data 43 of the audio packet APT included in the reproduction audio pack PAP coincides with the head of the main frame 66 included in the reproduction audio pack PAP, and the result of the second division is outputted as the packet divided signal Srapp.

Subsequently, the multiplexing circuit 72Db first adds the packet header 65 to all of the division boundaries (i.e., the boundaries of the main frames 66 or the boundaries of the expansion portion frames 67 or the boundaries of the audio packs AP). Then, the multiplexing circuit 72Db multiplexes the pack headers 64, by the second multiplexing, at the head portions of the audio packs AP to generate the audio elementary stream made in the form of packs, and outputs it as the divided processed audio signal Srap. For this purpose, the multiplexing circuit 72Db generates the padding data PD to be actually recorded within the remained recording area of the proximate audio pack BAP according to need, similarly to the case of the MPEG1 system. Then, the multiplexing circuit 72Db includes the padding data PD in the data in the proximate audio pack BAP and multiplexes it with the packet header 65 indicating that the packet is the padding packet PDT at its head position. By the operation of the multiplexing circuit 72Db for the proximate audio pack BAP, the head position of the area where the audio data 43 is to be recorded coincides with the head of the main frame 66 included in the reproduction audio pack PAP, in the audio pack PAP subsequent to the proximate audio pack BAP.

By the operation of the dividing unit 72D, the audio elementary stream which is made in the form of packs according to the MPEG1 system or MPEG2 system is generated (see. the middle part of FIG. 6 or FIG. 8), and is outputted as the divided processed audio signal Srap.

Thereafter, the multiplexing unit 72E multiplexes, based on the time code Tt, the divided processed video signal Srvp including the video packs VP outputted from the dividing unit 72C with the divided processed audio signal Srap including the audio packs AP outputted from the dividing unit 72D by the unit of each pack P, and outputs the multiplexed signal as a compressed multiplexed signal Sr. Thereafter, the compressed multiplexed signal Sr thus outputted is temporarily stored in the hard disk device 73.

Timely in parallel with this, the memory 71 temporarily stores the control information inputted in advance on the basis of a cue sheet ST in which control information for controlling the reproduction of the record information R (i.e., the video manager 2, the control data 11 and the navi-pack 41 including the DSI data 51) are recorded, and outputs it as a control information signal Si in response to the demand from the control information generating unit 72F in the signal processing unit 72.

Then, the control information generating unit 72F determines the recording position of the reproduction audio pack PAP based on the time code Tt, the control information signal S1 outputted from the memory 71 and the data amount of the processed video signal Srv generated by the processing unit 72A and the processed audio signal Srav generated by the processing unit 72, and then generates and includes the audio pack address in the DSI data 51 within the navi-pack 41.

Timely in parallel with this, the control information generating unit 72F refers to the time code Tt, generates other necessary information and separates the DSI data 51 from the control information signal Si. Then, the control information generating unit 72F outputs the separated DSI data 51 as a DSI information signal Sdsi, corresponding to the DSI data 51, which is then temporarily stored in the hard disk device 74. At this time, the control information other than the DSI data 51 are also separated, respectively, in the control information generating unit 72F and stored in the hard disk device 74, although those information are omitted from the illustration in FIGS. 9 and 10.

The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information Sa including the DSI data 51 and the other control signals independently of each other on the basis of these read out signals, and stores the additional information Sa into the hard disk device 74. This is because there may be a control signal, which content is determined in dependence upon a generation result of the compressed multiplexed signal Sr among various control signals.

On the other hand, the controller 75 performs a time management for each of the operations of the signal process unit 72, the hard disk device 73 and the hard disk device 74, and reads out the additional information signal Sa from the hard disk device 74, and generates and outputs an information selection signal Scc to time-axis-multiplex the compressed multiplexed signal Sr and the additional information signal Sa.

After that, the compressed multiplexed signal Sr and the additional information signal Sa are read out from the hard disk device 73 or 74 and time-axis-multiplexed by the multiplexer 76, based on the information selection signal Scc from the controller 75, to be outputted as an information added compressed multiplexed Sap. At the stage of the information added compressed multiplexed signal Sap, the information to be recorded includes the control information, the video information and the audio information in the multiplexed manner due to the switching operation instructed by the controller 75, and is of the physical structure (physical format) as shown in the upper part of FIG. 6 or FIG. 8. The DSI data 51 is included in the navi-pack 41 independently of the other control information.

If there exists the sub picture information in the information to be recorded, it is inputted, by other means such as a hard disk device not illustrated, to the signal process unit 72, processed in the same manner as the video and audio information thereat to be included in the information added compressed multiplexed signal Sap.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

As described above, according to the recording apparatus S1 according to the embodiment, in the case of the audio stream compressed by the MPEG1 system, the head position of the audio frame AF can be detected by detecting the audio pack AP specified by the audio pack address, because the head position of the recording area of the audio data 43 in the reproduction audio pack PAP coincides with the head of the audio frame AF.

Further, in order to make the head portion of the audio data 43 in the audio pack AP specified by the audio pack address coincident with the head portion of the audio data 43 in the audio frame AF, remained area in the proximate audio pack BAP is filled with the padding data PD. Therefore, the amount or size of the audio pack AP is always kept constant, and the head portion of the information unit may be securely detected at the time of reproducing the record information R.

On the other hand, in the case of the audio stream compressed by the MPEG2 system, since the head portion of the recording area of the audio data 43 in the reproduction audio pack BAP coincides with the head portion of the main frame 66, the main frames 66 can be detected simultaneously by detecting the reproduction audio pack BAP at the time of reproducing the record information R.

Further, the main frame 66 and the expansion portion frames 67, which need to be reproduced successively, are recorded successively within one or successive audio packs AP in the audio stream of the same kind. Therefore, at the time of reproducing the main frames 66 and the expansion portion frames 67, the main frame 66 and the expansion portion frame 67 are detected together by simply reproducing the audio packs AP of the same kind, and it is unnecessary to detect the expansion portion frame 67 corresponding to the main frame 66 independently of the detection of the main frame 66.

(III) Embodiment of Reproducing Apparatus

Next, an embodiment of reproducing apparatus for reproducing the information recorded on the DVD 1 by the above mentioned recording apparatus will be explained with reference to FIGS. 11 to 13.

At first, a construction and an operation of the reproducing apparatus as the embodiment is explained with reference to FIG. 11.

Figure 11:
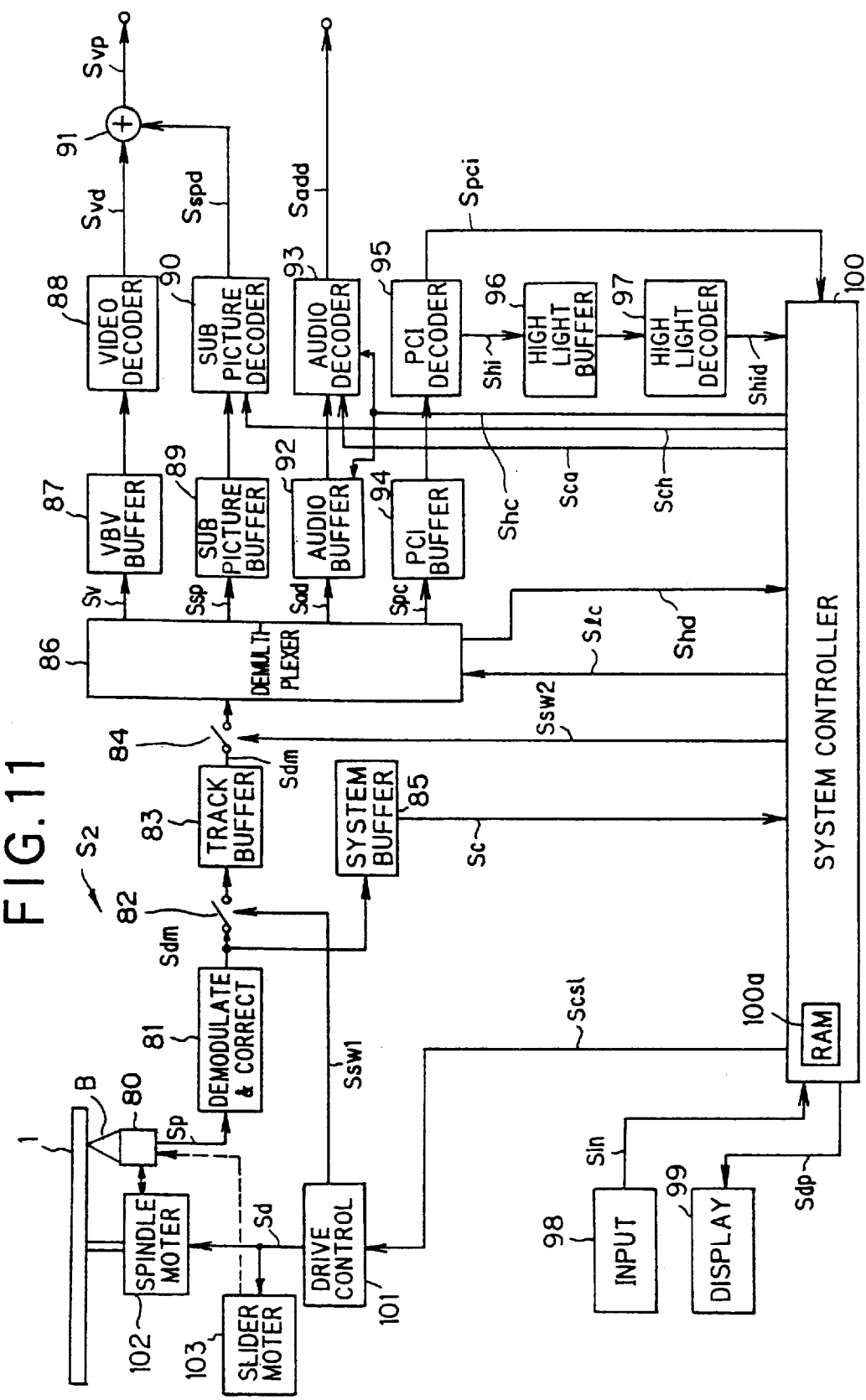
FIG. 11 is a block diagram of an information reproducing apparatus for reproducing the DVD in FIG. 1, as another embodiment of the present invention.

As shown in FIG. 11, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 11 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MEPG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information relating to whole contents of the information recorded on the DVD 1 (e.g., the video manager 2) and the control data 11 of the VTS 3 which are detected firstly upon loading the DVD 1 and which are related to the whole information recorded on the DVD 1. Then, the system buffer 85 outputs the accumulated data as a control information Sc to the system controller 100, and temporarily stores the DSI data 51 for each navi-pack 41 while reproducing the information, to output it also as the control information Sc.

The demultiplexer 86, to which the demodulation signal Sdm is continuously inputted through the stream switch 84, separates the video data 42, the audio data 43, the sub picture data 44 and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio data 43 or the sub picture data 44 in a plurality of different languages are included as the audio or sub picture information. In that case, a desirable language is selected for the audio or sub picture information by a stream selection signal Slc from the system controller 100, so that the audio or sub picture data in the desirable language is outputted to the audio buffer 92 or the sub picture buffer 89.

At this time, the demultiplexer 86 separates the pack headers 64 and the packet headers 65 from the respective packs (including the audio pack AP) and the packets (including the audio packets APT), and outputs information included therein to the system controller 100 as a header signal Shd.

The audio signal Sad includes only the audio elementary stream which is obtained by separating only the audio stream of the same kind, shown in the lower part of FIG. 6 or FIG. 8, and eliminating the pack headers 64, packet headers 65 and the padding packets PDT so as to include only the audio data 43, i.e., in a condition that the audio frame AF or the main frame 66 and the expansion portion frame 67 are successively included and can be decoded.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures (see. FIG. 2) of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad (in the form shown in the lower part of FIG.6 to FIG. 8), which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated.

The processing by the demultiplexer, 86 and audio buffer 92 and the audio decoder 93 is performed on the basis of the header control signal Shc produced based on the header signal Shd and the control signal Sc and supplied from the system controller 100. In the audio pack AP specified by the audio pack address in the DSI data 51, the demultiplexer 86 and the audio buffer 92 and the audio decoder 93 recognize that the head portion of the area where the audio data 43 in the audio pack AP is recorded coincides with the head portion of the recorded audio frame AF (main frame 66), and thereby the decoding is started correctly from the head portion of one audio frame AF (main frame 66). If the padding data PD (see. the middle part of FIG. 6) is included in the audio pack AP separated in the demultiplexer 86, the demultiplexer 86 disregards (jumps without reading) the padding data PD by referring to the information in the packet data 65 indicating that it is the padding data PD. By this, the padding data PD is prevented from being outputted from the demultiplexer 86, and only the audio stream shown in the lower part of FIG. 6 is inputted to the audio decoder 93 via the audio buffer 92.

Further, if it is necessary at the reproduction start timing immediately after the access to a desired information that the display start timing of the demodulated video signal Svd is synchronized with the output timing of the decoded audio signal Sadd, the system controller 100 outputs the pause signal Sca to the audio decoder 93. Then, the audio decoder 93 stops reading out the audio signal Sad from the audio buffer 92, the demodulation processing, and the outputting of the decoded audio signal Sadd. Then, at the timing at which the pause signal Sca is released, the audio decoder 93 restarts reading out the audio signal Sad from the audio buffer 92, the demodulation processing, and the outputting of the decoded audio signal Sadd.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video data 42, the audio data 43 and the sub picture data 44 corresponding to the PCI data 50, and apply the PCI data 50 to the video data 42, the audio data 43 and the sub picture data 44 and the like. Then, from the PCI signal Spc, which is synchronized with the corresponding the video data 42, the audio data 43 or the sub picture data 44 by the PCI buffer 94, a high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item (selection buttons), which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The demodulated high light signal Shid includes information for setting the aforementioned register in the system controller 100.

Here, the system controller 100 outputs the aforementioned high light control signal Sch to change the display condition by the high light information, on the basis of the decoded high light signal Shid. At this time, the system controller 100 accepts the selection operation by the input signal Sin from the input unit 98 and outputs the high light control information Sch so as to validate the selection operation using the menu display based on the high light information, on the basis of the valid period information included in the demodulated high light signal Shid and indicating the valid time period of the highlight information.

On the basis of the control information Sc inputted from the system buffer 85, the header signal Shd inputted from the demultiplexer 86, the PCI information signal Spci inputted from the PCI decoder 95 and the input signal Sin inputted from the input unit 98 such as a remote controller, the system controller 100 outputs the aforementioned switch signal Ssw2, the stream selection signal Slc, the header control signal Shc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scsl corresponding to the track jump process, to the drive controller 101, when it detects by the control signal Sc from the DSI information signal Sdsi or the like that it is necessary to perform the track jump process such as a search in order to perform the seamless reproduction.

Then, the drive controller 101, to which the seamless control signal Scsl is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 11), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scsl, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Next, the description will be given of the decoding processing of the audio data 43, at the time of reproducing the audio data 43 recorded on the DVD 1, with reference to FIG. 12. In FIG. 12, the operation represented by steps S1 to S10 are basically performed by the demultiplexer 86 and the audio buffer 92 and the system controller 100, and the operation of step S11 is basically performed by the audio decoder 93.

In the processing of the decoding of the audio data 43, first, the demultiplexer 86 detects the packet header 65 from the demodulated signal Sdm successively outputted by the track buffer 83 and judges whether or not the desired navi-pack 41 is detected (step S1). If not (step S1:NO), the packs other than the desired navi-pack 41 are continuously disregarded. If it is detected (step S1:YES) the system controller 100 starts decoding processing of the corresponding navi-pack 41. Then, the system controller 100 obtains the DSI data 51 in the navi-pack 41 (step S2), and recognizes the recording position on the DVD 1 of the reproduction audio pack PAP which reproduction is controlled based on the navi-pack 41, by referring to the audio pack address included in the DSI data 51. Then, the system controller 100 compares the address of the navi-pack 41 currently detected with the audio pack address to judge whether or not the recording position on the DVD 1 of the reproduction audio pack PAP is prior to the address currently detected (step S3). If the reproduction audio pack PAP is prior to the currently detected address (step S3:YES), the system controller 100 controls the drive controller 101 to let the pickup 80 jump to the recording position of the target reproduction audio pack PAP on the DVD 1 (step S4) Alternatively, if the reproduction audio pack PAP is located behind the currently detected address (step S3:NO), the system controller 100 disregards the audio pack AP located prior to the position specified by the audio pack address so as not to perform the processing (step S5).

Next, the reproduction audio pack PAP specified by the audio pack address is detected (step S6). As described above, in the reproduction audio pack PAP, since information is recorded from the head of the audio frame AF (in the case of MPEG1 system) or the main frame 66 (in the case of MPEG2 system), the demultiplexer 86 separates the reproduction audio pack PAP, eliminates the pack headers 64 and the packet headers 65 to separate only the audio data 43, and outputs it to the audio buffer 92 from the head portion of the audio frame AF or the main frame 66 (step S7). Timely in parallel with this, the demultiplexer 86 outputs the information included in the pack headers 64 and the packet headers 65, which are separated from the reproduction audio pack PAP, to the system controller 100 as the header signal Shd.

Subsequently, the system controller 100 sets a parameter Ts indicating the reproduction time to the reproduction time specified by the PTM (Presentation Time) in order to obtain the decoded audio signal Sadd in synchronous with the video data 42 at the head portion of the VOBU 30 (step S8). The PTM indicates the time of the reproduction and output of the audio data 43 included in the audio pack AP, for each of the audio packs AP in the header signal Shd. Then, it is judged whether or not the reference time T controlling the operation of the reproducing apparatus S2 becomes the reproduction time indicated by the parameter Ts (step S9), and if not (step S9:NO), the system controller 100 becomes a waiting status with continuing the output of the pause signal Sca. Then, when the reproduction time arrives (step S9:YES), the system controller 100 releases the waiting status to stop the output of the pause signal Sca and to start reading the audio data 43 from the audio buffer 92 (step S10). The audio decoder 93 starts decoding the inputted audio data 43 (step S11). Since the audio data 43 inputted to the audio decoder 93 is the data from the head portion of the audio frame AF or the main frame 66, the audio decoder 93 can start decoding processing immediately. Then, the decoded audio data 43 is converted into an analog signal by a D/A converter (not shown) (step S12), and the sound is outputted from a speaker (not shown).

By this processing, it is possible to detect the audio frame AF or the main frame 66 which should be firstly reproduced in synchronous with the video data 42 at the head portion of the VOBU 30, and additionally no unnecessary audio data 43 is outputted from the middle portion of the audio frame AF or the main frame 66 to the audio buffer 92. Therefore, the audio decoder 93 can start decoding upon receipt of the audio frame AF or the main frame 66 from its head portion to promptly output the decoded data as the decoded audio signal Sadd.

This effect is described in more detail. If the audio frame AF or the main frame 66 is not necessarily recorded from its head portion in the reproduction audio pack PAP, the search of the head portion of the audio frame AF or the main frame 66 requires quite complicated processing. In that case, the decoding processing of the audio data 43 cannot be started until the audio decoder 93 detects the head portion of the audio frame AF or the main frame 66 corresponding to the reproduction time of the video data 42. This may result in the interruption of the reproduction.

The above effect will be described in further detail by taking an example of audio data 43 compressed by the MPEG1 system. Since the expansion processing of the audio data 43 cannot be started until the head portion of the audio frame AF is searched, the audio decoder 93 needs to perform such a complicated processing as shown in the flowchart of FIG. 13, in order to search the head portion of the audio frame AF. In FIG. 13, steps S1 to S6, steps S8 to S10 and step S20 are basically executed by the demultiplexer 86, the audio buffer 92 and the system controller 100, and steps S31 to S42 are basically executed by the audio decoder 93. Further, in FIG. 13, the identical steps to those shown in FIG. 12 are attached with identical step numbers and their explanation will be omitted.

Figure 12:
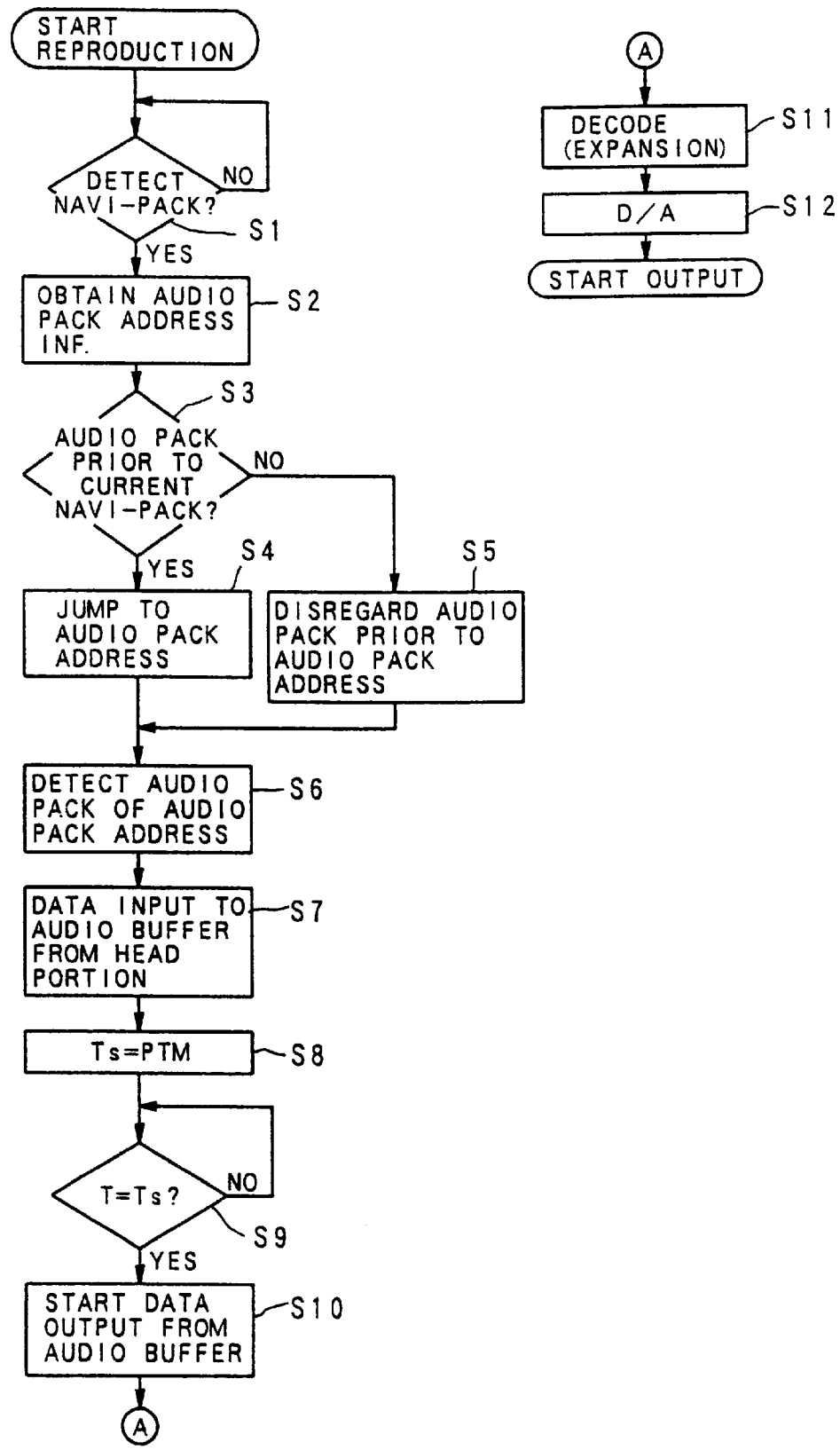
FIG. 12 is a flowchart showing an operation of reproducing audio data according to an embodiment of the present invention.
Figure 13:
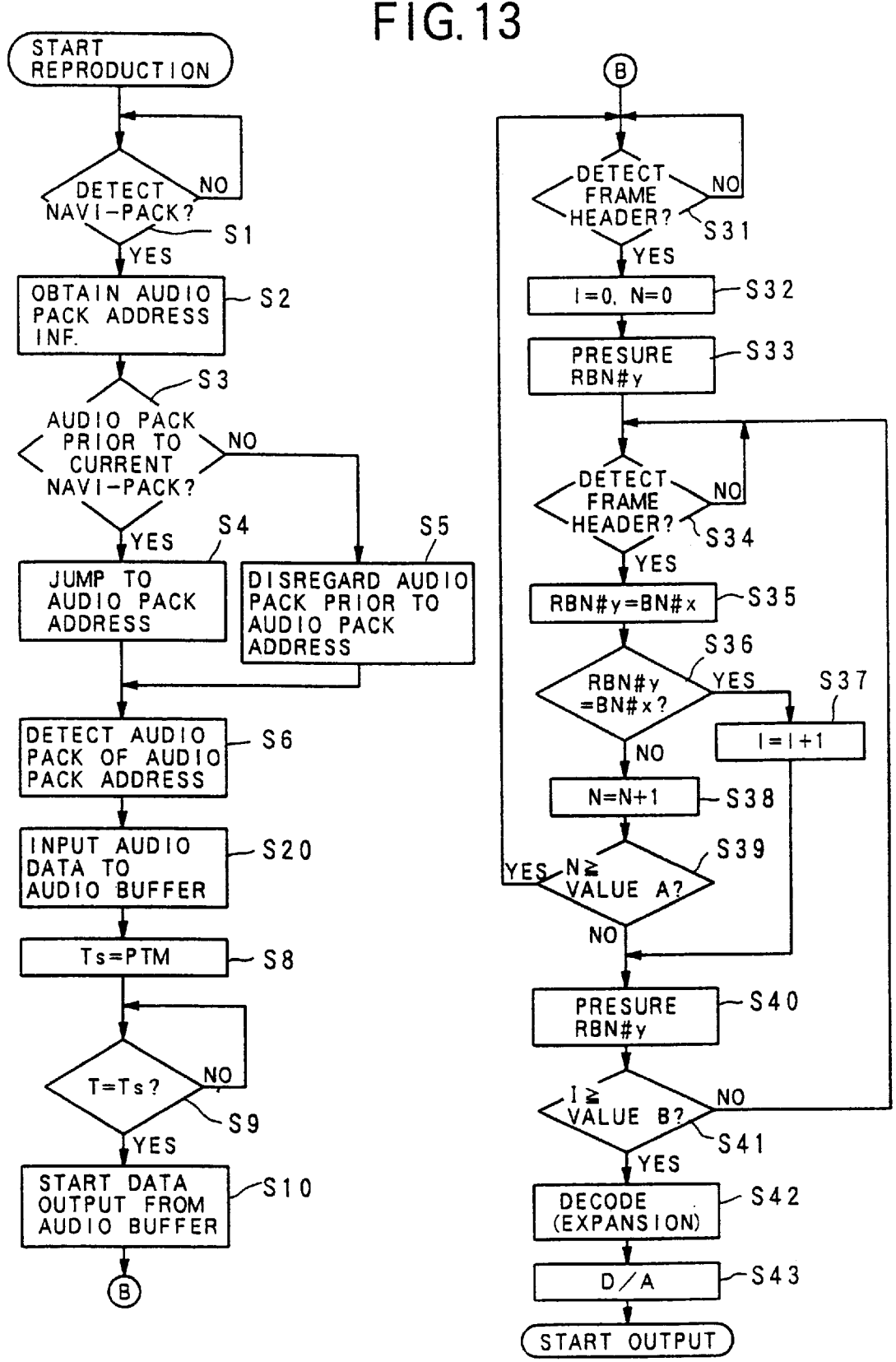
FIG. 13 is a flowchart showing an operation of reproducing audio data recorded in a manner different from the embodiment of the present invention.

In the operation shown in FIG. 13, first, the processing identical to those of steps S1 to S6 in FIG. 12 are executed.

When the reproduction audio pack PAP specified by the audio pack address is detected in step S6, the demultiplexer 86 separates the reproduction audio pack PAP, eliminates the pack headers 64 and the packet headers 65 to extract only the audio data 43, and then outputs the audio data 43 to the audio buffer 93 (step S20), regardless of whether or not the audio data 43 is the head of the audio frame AF or the main frame 66. Timely in parallel with this, the demultiplexer 86 outputs the information included in the pack headers 64 and the packet headers 65, which are separated from the reproduction audio pack PAP, to the system controller 100 as the header signal Shd.

Thereafter, the same processing as steps S8 to S10 in FIG. 12 are executed mainly by the system controller 100 so that the audio buffer 92 starts reading out the audio data 43 (step S10). In the above processing, the system controller 100 can detect the audio data 43 to be firstly reproduced synchronously with the video data 42 at the head portion of the VOB unit 30. However, to the audio buffer 92, unnecessary audio data 43 is inputted from middle of the audio frame AF, and hence the audio decoder 93 receives data from the middle portion of the audio frame AF. Therefore, the audio decoder 93 cannot immediately start the decoding upon receipt of the data, and cannot immediately output the decoded audio signal Sadd.

For this reason, the audio decoder 93 has to perform the processing of steps S31 to S42 shown in FIG. 13.

Namely, the audio decoder 93 judges whether or not the header (not shown) at the head portion of the audio frame AF is detected (step S31), and if not (step S31:NO), the audio decoder 93 keeps the waiting status. If the audio decoder 93 detects the header (step S31:YES), it then initializes a parameter I indicative of the number of the correct header detected and a parameter N indicative of the number of the incorrect header detected (step S32).

Subsequently, the audio decoder 93 presumes the position of the next header based on the fact that the each audio frame AF contains data of a constant amount, and sets the presumed position as a parameter RBN#y (step S33). Then, the audio decoder 93 judges whether or not the next header is detected on the basis of the inputted audio data 43 (step S34), and if not (step S34:NO), the audio decoder 93 keeps the waiting status. If it is detected (step S34 :YES), it sets the detected position of the header to a parameter BN#x (step S35). Then, the audio decoder 93 judges whether or not the parameter RBN#y is equal to the parameter BN#x (step S36). If they are equal to each other (step S36:YES), the audio decoder 93 recognizes that the header detected in step S34 is correct header, increments the parameter I by one (step S37), and then goes to the processing in step S40.

On the other hand, if the parameter RBN#y is not equal to the parameter BN#x (step S36:NO), the audio decoder 93 recognized that the header detected in step S34 is incorrect header and increments the parameter N by one (step S38). When the parameter N becomes larger than a predetermined value A (e.g., 3) (Step S39;YES), the audio decoder 93 judges that the correct header is not detectable and returns to step S31 to repeat the whole steps again from the start.

If the parameter N is less than the predetermined value A (step S39;NO), the audio decoder 93 assumes that the header detected in step S34 is correct header and presumes the next header position to set it to the parameter RBN#y (step S40). Then, the audio decoder 93 judges whether or not the parameter I is larger than a predetermined value B (e.g., 3) (step S41), and if it is larger than the value B (step S41;YES), the audio decoder 93 starts decoding from the header position detected in step S34. On the other hand, if the parameter I is less than the value B (step S41;NO), the audio decoder returns to step S34 to detect next header.

After the initial header of the audio frame AF is detected by the processing of steps S31 to S41, the audio decoder 93 starts the expansion processing for the first time (step S42) to execute the decoding processing of the audio data 43, and the decoded signal is D/A-converted and outputted (step S43).

As described above, if the data is not recorded from the head portion of the audio frame AF within the reproduction audio pack PAP, the above described complicated processing is required. Therefore, the decoding processing by the audio decoder 93 requires long time, and the burden in the processing on the audio decoder 93 increases. In contrast, by employing the structure of the audio frame AF or the main frame 66 in the aforementioned preferred embodiment of the present invention, the decoding processing of the audio data 43 can be performed in the simple steps as shown in FIG. 12. As a result, processing time for the decoding may be reduced, and the burden on the audio decoder 93 in the decoding processing is also diminished.

Further, according to the embodiment of the present invention, at the time of reproducing the audio data 43 compressed by the MPEG2 system, the expansion portion frame 67 is automatically detected subsequent to the main frame 66 by starting the reproduction of the reproduction audio pack PAP, thereby enabling to start the decoding processing immediately after the detection of them.

Further, since the multiplexer 86 outputs the main frame 66 and the expansion portion frame 67 successively to the audio decoder according to the MPEG2 system, the time adjustment of the main frame 66 and the expansion portion frame 67 is unnecessary, and only one audio buffer is required. In this respect, if the main frame 66 and the expansion portion frame 67 are recorded separately from each other, unlike the preferred embodiment of the present invention, the audio decoder cannot start decoding until both of them are obtained. For this reason, separate audio buffers, one for the main frame 66 and the other for the expansion portion frame 67, are required to input them to the audio decoder 93 simultaneously.

As described above, in the reproducing apparatus S2 of the embodiment, the head portion of the recording area of the audio data 43 in the reproduction audio pack PAP is coincident with the head portion of the audio frame AF or the main frame 66 recorded. Therefore, the audio decoder 93 can detect the head portion of the audio frame AF or the main frame 66 by detecting the reproduction audio pack 66, thereby enabling the correct decoding of the audio frame AF or the main frame 66.

In addition, since the padding data PD is recorded in the remained area in the proximate audio pack BAP, the demultiplexer 86 detects it and disregards it in the reproduction. Therefore, the head position of the audio frame AF or the main frame 66 may be accurately detected.

Still further, in the case of MPEG2 system, the main frame 66 and the expansion portion frame 67, which need to be decoded together, are successively recorded in one or plural successive audio packs AP within the audio stream of the same kind, which is made in the form of packs. Therefore, the main frame 66 and the expansion portion frame 67 are detected together by extracting only the audio packs AP in the audio stream of the same kind, and hence it is unnecessary to independently search the expansion portion frame 67 accompanying with main frame 66.

The above description is given to the case where the information compressed by the MPEG1 system or the MPEG2 system are recorded on the DVD 1. However, the application of the present invention is not limited to this feature. Namely, the present invention is applicable to any kind of compression system which requires the track buffer in reproduction of the compressed data, not only a fixed rate compression system but also a variable rate compression system, i.e., applicable to various kinds of information recording and reproduction performance, irrespective of the information compression system employed.

Further, the information recording medium is not limited to the DVD.

What is claimed is:

1. An information recording medium comprising:
   processed record information comprising a plurality of information units, the processed record information forming a plurality of record units; and
   search control information including address information indicating an address of a reproduction record unit which is one of the plurality of record units,
   wherein the reproduction record unit comprises an information unit whose head portion corresponds to a head portion of an area where the processed record information is recorded in the reproduction record unit.

2. The medium according to claim 1, wherein the search control information is multiplexed with the processed record information.

3. The medium according to claim 1, wherein the plurality of record units include a proximate record unit, which precedes the reproduction record unit, including padding data for a first information amount subsequent to the processed information recorded therein, in a case where an information amount of the processed record information to be recorded in the proximate record unit is less than a capacity of the proximate record unit.

4. The medium according to claim 3, wherein the first information amount is equal to a difference between the capacity of the proximate record unit and the information amount of the processed record information to be recorded in the proximate record unit.

5. The medium according to claim 1, wherein the processed record information is audio information, and the address information indicates an address of audio information to be reproduced simultaneously with video information recorded on the information recording medium.

6. The medium according to claim 1, wherein the processed record information comprises main record information and sub-record information, the main record information being divided into a plurality of main record units, and the sub-record information being divided into a plurality of sub-record units, the main record unit and the sub-record unit being multiplexed so that the record unit includes at least one of the main record unit and the sub-record unit, at least at a portion thereof.

7. The recording medium according to claim 6, wherein each sub-record unit is appendant to a preceding main record unit.

8. An information recording medium comprising:
 a plurality of data groups each comprising a navigation unit and at least one of a video unit having video information, an audio unit having audio information comprising a plurality of audio frames, and a sub-picture unit having sub-picture information;
 wherein the navigation unit includes search control information including address information indicating an address of a reproduction audio unit to be reproduced in synchronization with predetermined video information; and
 wherein the reproduction audio unit comprises an audio frame whose head portion corresponds to a head portion of an area where the audio information is recorded in the reproduction audio unit.

9. The medium according to claim 8, wherein the navigation information is located at the beginning portion of the data groups.

10. The medium according to claim 8, further comprising a proximate audio unit preceding the reproduction audio unit, the proximate audio unit including padding data for a first information amount subsequent to the audio information recorded therein, in a case where an information amount of the audio information to be recorded in the proximate audio unit is less than a capacity of the proximate audio unit.

11. The medium according to claim 10, wherein the first information amount is equal to a difference between the capacity of the proximate audio unit and the information amount of the audio information to be recorded in the proximate audio unit.

12. The medium according to claim 8, wherein the audio information comprises main audio information and sub-audio information, the main audio information being divided into a plurality of main audio units, and the sub-audio information being divided into a plurality of sub-audio units, the main audio unit and the sub-audio unit being multiplexed so that the audio unit includes at least one of the main audio unit and the sub-audio unit, at least at a portion thereof.

13. The recording medium according to the claim 12, wherein each sub-audio unit is appendant to a preceding main audio unit.

14. An information reproducing apparatus for reproducing an information from an information recording medium comprising:
 processed record information comprising a plurality of information units, the processed record information forming a plurality of record units; and
 search control information indicating an address of a reproduction record unit which is one of the plurality of record units,
 wherein the reproduction record unit includes an information unit whose head portion corresponds to a head portion of an area where the processed record information is recorded in the reproduction record unit,
 said information reproducing apparatus comprising:
 reading means for reading the information recording medium and thereby obtaining a read signal;
 demodulating means for demodulating the read signal and thereby obtaining a demodulated signal;
 extracting means for extracting, from the demodulated signal, the search control information; and
 reproduction control means for reproducing information based on the search control information.

15. The apparatus according to claim 14, further comprising second extracting means for extracting, from the demodulated signal, the plurality of record units; and
 decoding means for decoding the processed record information, and thereby obtaining decoded information.

16. The apparatus according to claim 14, wherein the processed record information comprises main record information and sub-record information, the main record information being divided into a plurality of main record units, and the sub-record information being divided into a plurality of sub-record units, the main record unit and the sub-record unit being multiplexed so that the record unit includes at least one of the main record unit and the sub-record unit at least at a portion thereof,
 the apparatus further comprising:
 second extracting means for extracting, from the demodulated signal, the main record units and the sub-record units; and
 decoding means for decoding the main record information in the main record unit and the sub-record information in the following sub-record unit together with each other, and thereby obtaining decoded information.

17. An information reproducing apparatus for reproducing information from an information recording medium comprising:
 a plurality of data groups each comprising a navigation unit and at least one of a video unit having video information, an audio unit having audio information comprising a plurality of audio frames, and a sub-picture unit having sub-picture information;
 wherein the navigation unit includes search control information including address information indicating an address of a reproduction audio unit to be reproduced in synchronization with a predetermined video information; and
 wherein the reproduction audio unit comprises an audio frame whose head portion corresponds to a head portion of an area where the audio information is recorded in the reproduction audio unit;
 said apparatus comprising:
 reading means for reading the information recording medium, thereby obtaining a read signal;
 demodulating means for demodulating the read signal, thereby obtaining a demodulated signal;
 extracting means for extracting, from the demodulated signal, the search control information; and
 reproduction control means for reproducing information based on the search control information.

18. The apparatus according to claim 17, further comprising second extracting means for extracting, from the demodulated signal, the video units, the audio units and the sub-picture units;
 a video decoder for decoding the video information, thereby obtaining decoded video information;

an audio decoder for decoding the audio information, thereby obtaining decoded audio information; and a sub-picture decoder for decoding the sub-picture information, thereby obtaining decoded sub-picture information.

19. The apparatus according to claim 17, wherein the audio information comprises main audio information and sub-audio information, the main audio information being divided into a plurality of main audio units, and the sub-audio information being divided into a plurality of sub-audio units, the main audio unit and the sub-audio unit being multiplexed so that the audio unit includes at least one of the main audio unit and the sub-audio unit, at least a portion thereof, and wherein the audio decoder decodes the main audio information in the main audio unit and the sub-audio information in the following sub-audio unit together with each other, thereby obtaining the decoded audio information.

* * * * *